United States Patent
Uchida et al.

(10) Patent No.: US 10,638,021 B2
(45) Date of Patent: Apr. 28, 2020

(54) MEASUREMENT DEVICE, PROCESSING DEVICE, AND ARTICLE MANUFACTURING METHOD

(71) Applicant: CANON KABUSHIKI KAISHA, Tokyo (JP)

(72) Inventors: Ippei Uchida, Saitama (JP); Michio Yanagisawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/912,941

(22) Filed: Mar. 6, 2018

(65) Prior Publication Data

US 2018/0262656 A1    Sep. 13, 2018

(30) Foreign Application Priority Data

Mar. 9, 2017   (JP) .................. 2017-045249

(51) Int. Cl.
    *H04N 5/04*       (2006.01)
    *B25J 9/16*       (2006.01)
    (Continued)

(52) U.S. Cl.
    CPC ............. *H04N 5/04* (2013.01); *B25J 9/1687* (2013.01); *B25J 9/1697* (2013.01); *G01B 11/24* (2013.01);
    (Continued)

(58) Field of Classification Search
    CPC ........... H04N 5/04; G06T 7/521; B25J 9/1697
    See application file for complete search history.

(56) References Cited

U.S. PATENT DOCUMENTS

| 2005/0000051 A1* | 1/2005 | Pahk | ...................... G01B 11/00 15/306.1 |
| 2006/0159331 A1* | 7/2006 | Kubo | ................... B23K 9/1274 382/141 |

(Continued)

FOREIGN PATENT DOCUMENTS

| JP | S60014105 A | 1/1985 |
| JP | 2001116516 A | 4/2001 |

(Continued)

OTHER PUBLICATIONS

Extended European Search Report issued in European Appln. No. 18000178.6 dated May 17, 2018.

*Primary Examiner* — Tsion B Owens
(74) *Attorney, Agent, or Firm* — Rossi, Kimms & McDowell LLP

(57) ABSTRACT

A measurement device for measuring a position of an object, includes an illuminator configured to illuminate the object, an image capturing device configured to capture the object illuminated by the illuminator, a calculator configured to obtain the position of the object based on an image obtained by the image capturing device, and a controller configured to control the illuminator and the image capturing unit. The controller outputs timing information indicating a timing determined in accordance with a measurement period that is an overlapping period of an illumination period for causing the illuminator to illuminate the object and an image capturing period for causing the image capturing device to capture the object.

26 Claims, 12 Drawing Sheets

(51) Int. Cl.
*H04N 5/225* (2006.01)
*G06T 7/521* (2017.01)
*G01B 11/25* (2006.01)
*G01B 11/24* (2006.01)

(52) U.S. Cl.
CPC .............. *G01B 11/25* (2013.01); *G06T 7/521* (2017.01); *H04N 5/2256* (2013.01); *G06T 2207/10152* (2013.01); *Y10S 901/09* (2013.01); *Y10S 901/47* (2013.01)

(56) References Cited

U.S. PATENT DOCUMENTS

| | | | | |
|---|---|---|---|---|
| 2013/0107032 | A1* | 5/2013 | Yamada | B25J 11/00 348/86 |
| 2014/0354803 | A1* | 12/2014 | Chida | G01B 11/25 348/136 |
| 2016/0223316 | A1* | 8/2016 | Jordil | G01B 11/005 |

FOREIGN PATENT DOCUMENTS

| | | | |
|---|---|---|---|
| JP | 2010110855 | A | 5/2010 |
| JP | 2012168135 | A | 9/2012 |
| JP | 2012168136 | A | 9/2012 |
| JP | 5740649 | B2 | 6/2015 |
| JP | 2017011573 | A | 1/2017 |
| WO | 2006098955 | A2 | 9/2006 |

\* cited by examiner

MEASUREMENT DEVICE, PROCESSING DEVICE, AND ARTICLE MANUFACTURING METHOD

BACKGROUND OF THE INVENTION

Field of the Invention

The present invention relates to a measurement device, a processing device, and an article manufacturing method.

Description of the Related Art

In recent years, in a step of manufacturing various articles, robots alternatively perform part of work which has been conventionally done by humans. For example, there is provided a technique in which a sensor with an illuminator for generating pattern light and an image capturing device is mounted at the distal end of a robot arm, and the position of a part is estimated based on an image of the part, which has been obtained by the sensor, while operating the robot arm. In this technique, the sensor measure the position and attitude of an article (part) in the local coordinate system (to be referred to as a sensor coordinate system hereinafter) of the sensor. Then, based on the position and attitude of the article in the sensor coordinate system and the position and attitude of the sensor in a global coordinate system (to be referred to as a robot coordinate system hereinafter), it is possible to measure the position and attitude of the article in the robot coordinate system. Therefore, it is necessary to measure the position and attitude of the object by the sensor and obtain the position and attitude of the sensor at the same time.

Each of Japanese Patent No. 5740649 and Japanese Patent Laid-Open No. 2012-168135 discloses an image measurement unit for performing a contrast AF search based on a plurality of pieces of image information captured while changing the focus position of an image capturing device for capturing an object. The image measurement device disclosed in Japanese Patent No. 5740649 obtains a shift amount between an image capturing timing and a focus position obtaining timing, and corrects the focus position based on the shift amount. The image measurement device disclosed in Japanese Patent Laid-Open No. 2012-168135 obtains a focus position based on a trigger signal output from one of the image capturing unit and a position control unit for controlling the focus position to the other.

With a measurement device for measuring the position of an object based on an image captured by an image capturing device while illuminating the object using an illuminator, it is difficult to make an illumination period for causing the illuminator to illuminate the object coincide with an image capturing period for causing the image capturing device to capture the object. This is because the responsiveness of the illuminator is different from that of the image capturing device. When the illumination period does not coincide with the image capturing period, if the timing of obtaining the position and attitude of the sensor is determined in accordance with one of the periods, a synchronization error occurs between the timing of measuring the object by the measurement device and the timing of obtaining the position and attitude of the sensor. If there is such synchronization error, it is impossible to accurately grasp the position of the object in the robot coordinate system. Japanese Patent No. 5740649 and Japanese Patent Laid-Open No. 2012-168135 do not assume that such synchronization error occurs.

SUMMARY OF THE INVENTION

The present invention provides a technique advantageous in reducing a synchronization error.

One of aspects of the present invention provides a measurement device for measuring a position of an object, the device comprising: an illuminator configured to illuminate the object; an image capturing device configured to capture the object illuminated by the illuminator; a calculator configured to obtain the position of the object based on an image obtained by the image capturing device; and a controller configured to control the illuminator and the image capturing unit, wherein the controller outputs timing information indicating a timing determined in accordance with a measurement period that is an overlapping period of an illumination period for causing the illuminator to illuminate the object and an image capturing period for causing the image capturing device to capture the object.

Further features of the present invention will become apparent from the following description of exemplary embodiments with reference to the attached drawings.

DESCRIPTION OF THE EMBODIMENTS

Exemplary embodiments of the present invention will be described below with reference to the accompanying drawings.

First Embodiment

Figure 1:
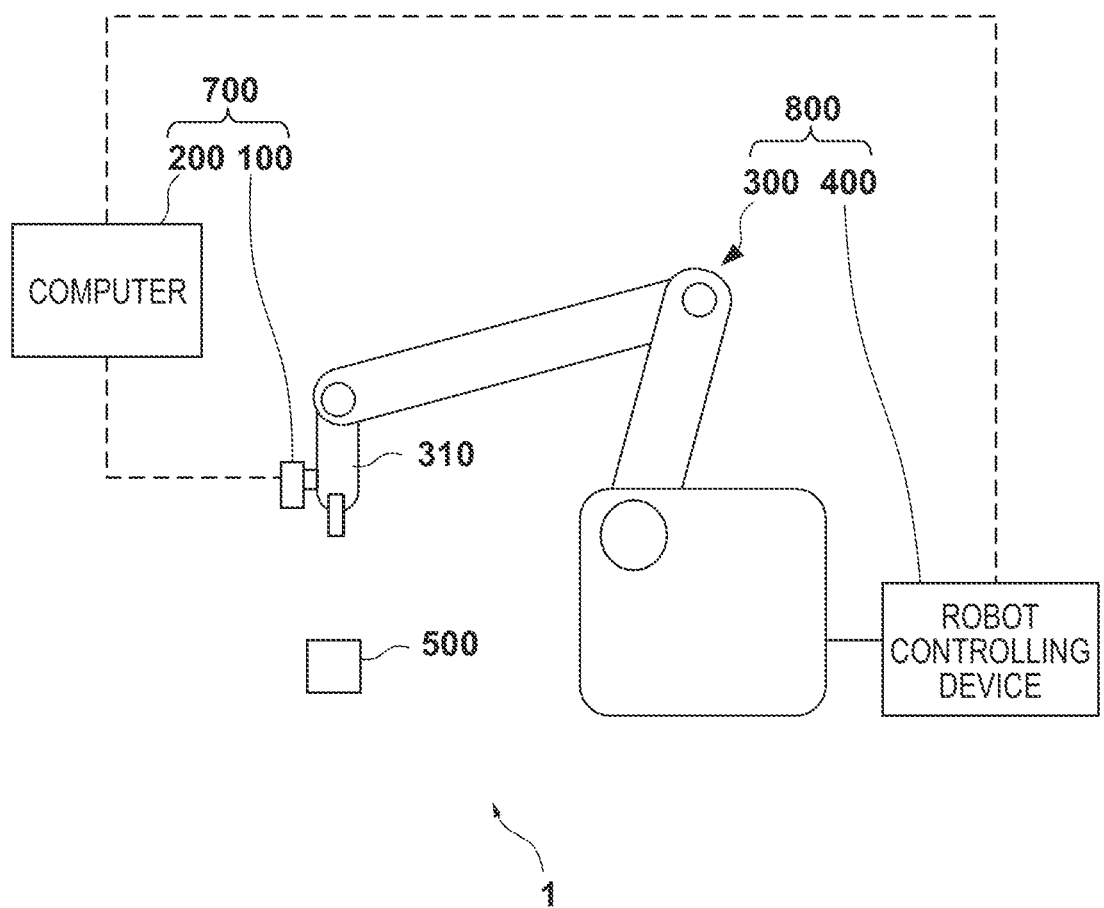
FIG. 1 is a view showing the arrangement of a processing device according to an embodiment of the present invention.

FIG. 1 shows the arrangement of a processing device 1 according to an embodiment of the present invention. The processing device 1 recognizes an object 500 and processes it. The processing of the object 500 includes, for example, holding (for example, gripping) the object 500, operating (for example, moving or rotating) the object 500, examining the object 500, fixing the object 500 to another object, or physically or chemically changing the object 500.

The processing device 1 can include a measurement device 700 for measuring the object 500, and a robot system 800 for processing the object 500 based on the measurement result of the measurement device 700. The measurement device 700 can include a sensor 100, and a computer 200 (calculator) for controlling the sensor 100 and processing information supplied from the sensor 100. All or some of the functions of the computer 200 may be incorporated in the sensor 100. The measurement of the object 500 can include, for example, measuring the position of the object 500 or measuring the position and attitude (for example, orientation, aspect, direction, or tilt) of the object 500. The robot system 800 can include a robot 300 with a hand 310 for processing the object 500 and a robot controlling device 400 for controlling the robot 300.

The sensor 100 can be fixed to the hand 310 of the robot 300. For example, the robot 300 can operate the hand 310 with respect to a plurality of axes (for example, six axes), and operate the object 500 held by the hand 310 with respect to the plurality of axes (six axes). The robot 300 can include an encoder for outputting the control amounts of the plurality of axes of the hand 310. The outputs from the encoder can be used by the robot controlling device 400 to control the hand 310 of the robot 300, and used to obtain the position and attitude of the sensor 100.

The measurement device 700 generates a range image of the object 500, and generates coordinate data of a three-dimensional point group on the object 500 based on the range image. The measurement device 700 generates a range image of the object 500, and then performs model fitting for the range image, thereby detecting the position and attitude of the object 500. The measurement device 700 generates a grayscale image of the object 500, and then performs model fitting for the grayscale image, thereby detecting the position and attitude of the object 500. Alternatively, the measurement device 700 generates a range image and grayscale image of the object 500, and detects the position and attitude of the object 500 based on both the range image and the grayscale image. Note that if it is unnecessary to detect the attitude of the object 500, the measurement device 700 can be configured to detect only the position of the object 500.

The range image has, for example, a range value calculated based on the principle of triangulation from a captured image obtained by capturing, by the image capturing device of the sensor 100, the object 500 illuminated with pattern light from the illuminator of the sensor 100. This method is called an active stereo method. The range image may be generated from one captured image or generated based on a plurality of images captured at the same time. As a method of generating a range image based on one captured image, for example, there is provided a method of projecting an encoded dot line pattern onto the object 500 and capturing the object 500.

The sensor 100 can measure the position and attitude of the object 500 in the sensor coordinate system based on the image captured by the sensor 100. The robot system 800 can obtain the position and attitude of the sensor 100 in the robot coordinate system. Using a matrix $Tr_{WS}$ representing the position and attitude of the object 500 in the sensor coordinate system and a matrix $Tr_{SR}$ representing the position and attitude of the sensor 100 in the robot coordinate system, a matrix $Tr_{WR}$ representing the position and attitude of the object 500 in the robot coordinate system can be calculated by:

$$Tr_{WR} = Tr_{WS} \times Tr_{SR} \quad (1)$$

The sensor 100 can be attached to the distal end of the hand 310 of the robot 300 via a mounter or the like. Therefore, when $Tr_{SM}$ represents the position and attitude of the sensor 100 in a mounter coordinate system and $Tr_{MR}$ represents the position and attitude of the mounter in the robot coordinate system, $Tr_{SR}$ in equation (1) is equal to the product of $Tr_{SM}$ and $Tr_{MR}$. That is, the matrix $Tr_{WR}$ representing the position and attitude of the object 500 in the robot coordinate system can be calculated using $Tr_{SM}$ and $Tr_{MR}$, by:

$$Tr_{WR} = Tr_{WS} \times Tr_{SM} \times Tr_{MR} \quad (2)$$

Note that it is possible to know the positional relationship between the sensor 100 and the mounter by calibration performed at the time of installation of the sensor 100. Furthermore, it is possible to know the position and attitude of the mounter in the robot coordinate system based on the outputs from the encoder with respect to the respective axes of the robot 300. Calculation of equation (1) or (2) may be executed by the computer 200, the sensor 100, or the robot controlling device 400.

In the processing device 1, while the robot 300 moves the sensor 100 relative to the object 500 by moving the hand 310, the sensor 100 captures the object 500. The computer 200 detects the position and attitude of the object 500 in the sensor coordinate system based on images captured by the sensor 100. On the other hand, the robot controlling device 400 obtains the position and attitude of the sensor 100 in the robot coordinate system based on the outputs from the encoder of the robot 300. The robot controlling device 400 can calculate the position and attitude of the object 500 in the robot coordinate system based on the position and attitude of the sensor 100 in the robot coordinate system and the position and attitude of the object 500 in the sensor coordinate system. Based on the position and attitude of the object 500 in the robot coordinate system, the robot controlling device 400 controls the robot 300 to pick up the object 500.

In the sensor 100, the illuminator illuminates the object 500 with pattern light, and the image capturing device captures the pattern light. The sensor 100 supplies a captured image to the computer 200, and the computer 200 can generate a range image by processing the supplied image, and calculate the position and attitude of the object 500 based on the range image. In this method, a measurement period (overlapping period) as a period in which an illumination period for causing the illuminator of the sensor 100 to illuminate the object 500 and an image capturing period for causing the image capturing device to capture the object 500 overlap each other contributes to measurement of the object 500 in the measurement device 700. That is, in the measurement period, the pattern light entering the photoelectric converter of each pixel of the image capturing device is photoelectrically converted, thereby accumulating the generated charges. If the current time falls within the image capturing period but outside the illumination period, the pattern light is not photoelectrically converted. If the current time falls within the illumination period but outside the image capturing period, the pattern light is not photoelectrically converted.

If the sensor 100 (hand 310) is moving relative to the object 500, the image capturing device captures an image (this image moves) of the pattern light formed on the image sensing surface of the image capturing device during the measurement period. If it is considered that the sensor 100 moves relative to the object 500 at a constant speed, the computer 200 calculates the average values of the positions and attitudes of the object 500 during the measurement period. The average values of the positions and attitudes of the object 500 during the measurement period respectively match the position and attitude of the object 500 at the midpoint (measurement central time) of the measurement period.

The robot controlling device 400 needs to synchronize the timing of measuring, by the measurement device 700, the position and attitude of the object 500 in the sensor coordinate system with the timing of obtaining, by the robot controlling device 400, the position and attitude of the sensor 100 in the robot coordinate system. To do this, the robot controlling device 400 obtains the position and attitude of the sensor 100 in the robot coordinate system at the timing of the midpoint of the measurement period.

A measurement error caused by a synchronization error will be exemplified for reference. Assume, for example, that a synchronization error between the timing of measuring, by the measurement device 700, the position and attitude of the object 500 in the sensor coordinate system and the timing of obtaining, by the robot controlling device 400, the position and attitude of the sensor 100 in the robot coordinate system is 1 ms. In this case, if the sensor 100 moves at 1 m/sec by moving the hand 310 of the robot 300, the position of the object 500 converted into the robot coordinate system includes an error of 1 mm.

Figure 2:
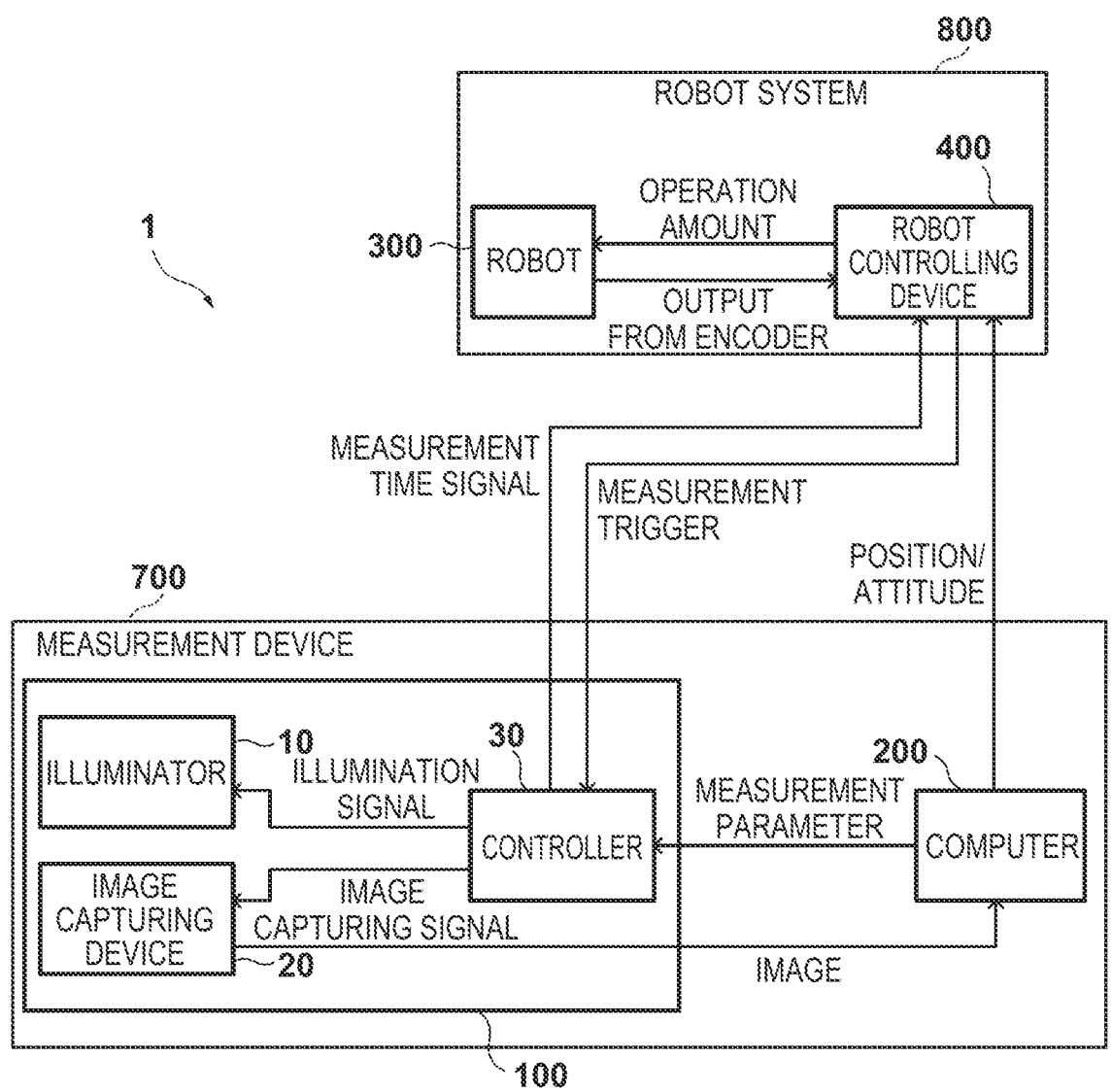
FIG. 2 is a block diagram showing the arrangement of a processing device according to the first embodiment of the present invention.

FIG. 2 shows the arrangement of the processing device 1 according to the first embodiment of the present invention. The processing device 1 can include the measurement device 700 and the robot system 800. The measurement device 700 includes the sensor 100 to obtain the position and attitude of the object 500 by the active stereo method. Note that if it is unnecessary to obtain the attitude of the object 500, the measurement device 700 obtains only the position of the object 500.

The sensor 100 can include an illuminator 10 for illuminating the object 500 with pattern light, an image capturing device 20 for capturing the object 500 illuminated with the pattern light, and a controller 30 for controlling the illuminator 10 and the image capturing device 20. The controller 30 outputs a measurement time signal as timing information indicating a timing determined in accordance with the measurement period as the overlapping period of an illumination period for causing the illuminator 10 to illuminate the object 500 and an image capturing period for causing the image capturing device 20 to capture the object 500. The measurement device 700 can include the computer 200 (calculator) in addition to the sensor 100. For example, the computer 200 generates a range image of the object 500 based on an image supplied from the image capturing device 20 of the sensor 100, and obtains the position and attitude of the object 500 based on the range image.

The illuminator 10 can include, for example, a light source such as an LED (Light Emitting Diode), a mask for generating pattern light using light from the light source, an optical system for projecting the pattern light, and a drive circuit for driving the light source. The mask is a member on which a pattern to be projected onto the object 500 is drawn, and can be obtained by, for example, forming a light blocking portion on a glass substrate by chromium plating. Instead of using the mask, a DMD (Digital Mirror Device) or liquid crystal panel may be adopted.

The image capturing device 20 can include an image sensor and an imaging optical system for forming, on the image sensing surface of the image sensor, an image of the object 500 illuminated with the pattern light. The image sensor can be a CCD image sensor, a CMOS image sensor, or the like. If a CMOS image sensor is adopted, a global shutter type CMOS image sensor is desirably used. For a rolling shutter type CMOS image sensor, an image capturing period (measurement period) is different for each row, which may cause an error.

The controller 30 can be formed by, for example, a PLD (Programmable Logic Device) such as an FPGA (Field Programmable Gate Array), or an ASIC (Application Specific Integrated Circuit). The controller 30 controls the illuminator 10 and the image capturing device 20 based on measurement parameters such as the illumination period and image capturing period set by the computer 200.

The measurement parameters such as the illumination period and image capturing period may be set by the computer 200 or the robot controlling device 400. Alternatively, pre-measurement may be performed prior to measurement of the position and attitude of the object 500, and the controller 30 may set the illumination period and image capturing period based on the result of the pre-measurement. The measurement parameters can be set in accordance with the reflectance of the object 500. For example, if the object 500 is an object having a high reflectance like metal, the illumination period and image capturing period are set to have short times. Conversely, if the object 500 is a black object having a low reflectance, the illumination period and image capturing period are set to have long times.

The controller 30 can be configured to, for example, start control of illumination by the illuminator 10 and image capturing by the image capturing device 20 in response to a measurement trigger provided from the robot controlling device 400. Alternatively, the controller 30 can be configured to start control illumination by the illuminator 10 and image capturing by the image capturing device 20 in response to a measurement trigger provided from the robot controlling device 400 via the computer 200.

To transmit the measurement parameters from the computer 200 to the controller 30, the computer 200 and the controller 30 can be connected by, for example, an interface such as Ethernet or RS-232C. To provide a measurement trigger from the robot controlling device 400 to the controller 30, the robot controlling device 400 and the controller 30 can be connected by, for example, an interface such as a photocoupler. To control the operation of the illuminator 10, the controller 30 and the illuminator 10 can be connected by, for example, a digital signal line for transmitting an illumination signal, and the controller 30 can control an illumination operation by the illuminator 10 depending on whether to set the illumination signal to active level. The controller 30 and the image capturing device 20 can be connected by, for example, a digital signal line for transmitting an image capturing signal, and the controller 30 can control an image capturing operation by the image capturing device 20 depending on whether to set the image capturing signal to active level.

The controller 30 transmits the measurement time signal to the acceleration obtainer 40 to synchronize the timing of measuring, by the measurement device 700, the position and attitude of the object 500 with the timing of obtaining, by the robot controlling device 400, the position and attitude of the sensor 100. The measurement time signal is a signal (timing information) indicating a timing determined in accordance with the measurement period, more specifically, a signal indicating the timing of the midpoint of the measurement period.

Figure 3:
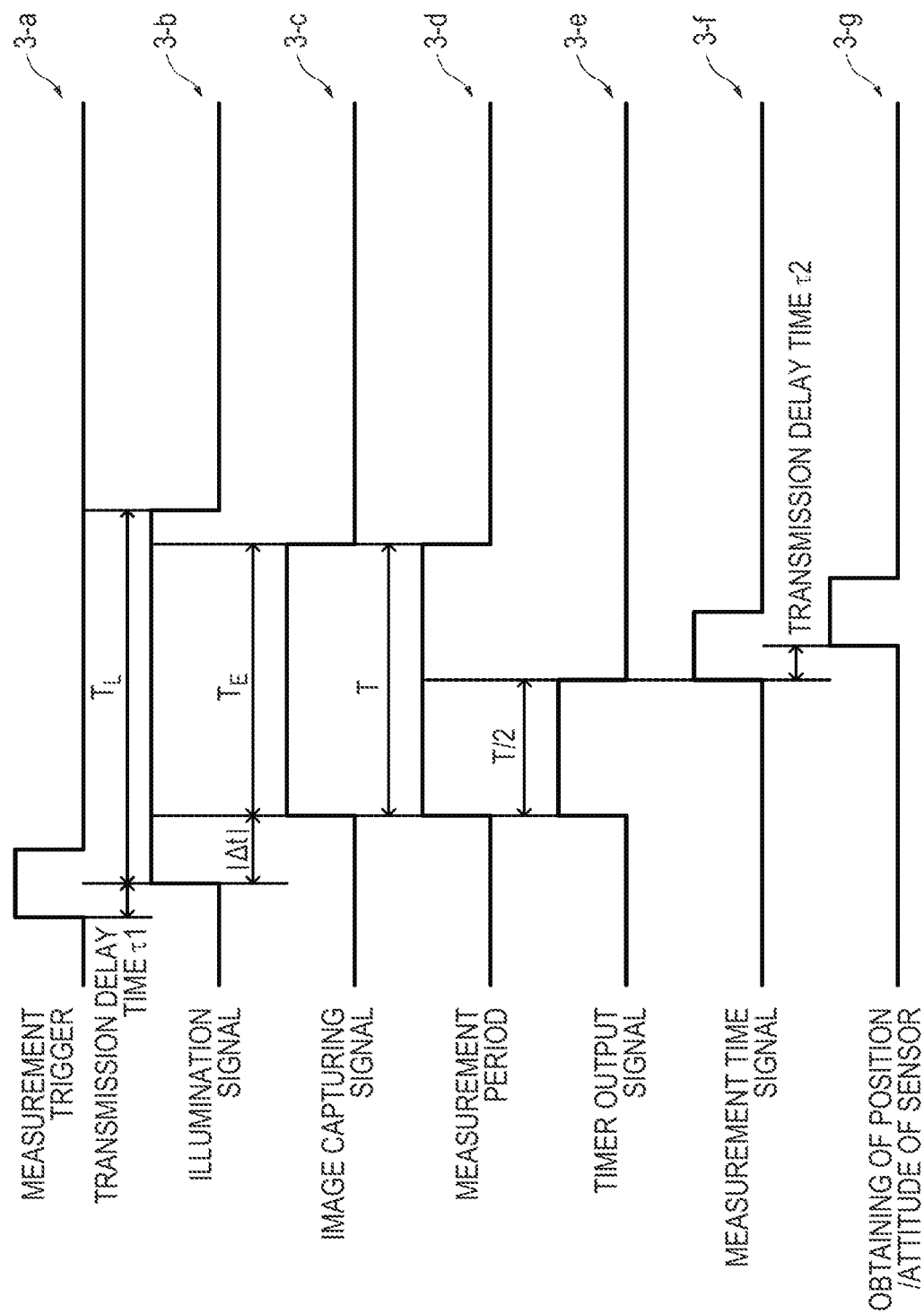
FIG. 3 is a timing chart showing the operation of the processing device according to the first embodiment of the present invention.

The operation of the processing device 1 according to the first embodiment will be described below with reference to a timing chart shown in FIG. 3. The measurement trigger (3-$a$) output from the robot controlling device 400 is received by the controller 30 after a lapse of a transmission delay time τ1 generated in an interface circuit and communication path forming the interface between the robot controlling device 400 and the controller 30. In response to reception of the measurement trigger (3-$a$), the controller 30 starts control for measurement. More specifically, in response to reception of the measurement trigger (3-$a$), the controller 30 sets the illumination signal (3-$b$) to active level for the illumination period, and sets the image capturing signal (3-$c$) to active level for the image capturing period. As an example, if the cable length of the communication path forming the interface between the robot controlling device 400 and the sensor 100 is 10 m, the transmission delay time τ1 is dominated by a transmission delay in the interface circuit, and is, for example, about several tens of µs.

Let $T_L$ be the illumination period during which the controller 30 causes the illuminator 10 to illuminate the object 500 (the period during which the illumination signal is maintained at active level), $T_E$ be the image capturing period during which the controller 30 causes the image capturing device 20 to capture the object 500 (the period during which the image capturing signal is maintained at active level), and Δt be the difference between the timing of causing the illumination signal to transit to active level and the timing of causing the image capturing signal to transit to active level. The computer 200 can preset $T_L$, $T_E$, and Δt as measurement parameters. As exemplified in FIG. 3, setting the illumination period $T_L$ to be longer than the image capturing period $T_E$ is useful when, for example, the time taken to switch the operation state of the image capturing device 20 is shorter than the time taken to switch the operation state of the illuminator 10. For example, Δt can be set in consideration of the time taken to stabilize illumination light generated by the illuminator 10. The illumination period and the image capturing period are not limited to those in the example of FIG. 3, and various relationships can be assumed.

As described above, a measurement period T (3-$d$) as the overlapping period of the illumination period $T_L$ for causing the illuminator 10 to illuminate the object 500 and the image capturing period $T_E$ (exposure period) for causing the image capturing device 20 to capture the object 500 contributes to measurement of the object 500 in the measurement device 700. Therefore, the controller 30 causes the measurement time signal (3-$f$) to transit to the active level at the midpoint (to be referred to as measurement central time hereinafter) of the measurement period T. The measurement time signal (3-$f$) is a pulse signal in this example. The output of the measurement time signal is an example of a method of outputting timing information indicating a timing determined in accordance with the measurement period T.

The controller 30 can measure a period of T/2 by a timer after the start of the measurement period T (3-$e$), and output the measurement time signal (3-$f$) to the robot controlling device 400 at time when the period of T/2 elapses. Note that the timer for measuring the period of T/2 can be configured to, for example, operate by the AND of the illumination signal and the image capturing signal. The period of T/2 can be calculated using the illumination period $T_L$, the image capturing period $T_E$, and the difference Δt between the illumination start timing and the image capturing start timing, by:

$$T/2 = \begin{cases} T_E/2 & (\Delta t \geq 0, T_L \geq \Delta t + T_E) \\ (T_L - \Delta t)/2 & (\Delta t \geq 0, T_L < \Delta t + T_E) \\ (T_E + \Delta t)/2 & (\Delta t < 0, T_L \geq \Delta t + T_E) \\ T_L/2 & (\Delta t < 0, T_L < \Delta t + T_E) \end{cases} \quad (3)$$

Note that the value of T/2 changes in accordance with the values of $T_L$, $T_E$, and Δt, that is, the start and end timings of the illumination signal and image capturing signal.

T/2 may be calculated by the computer 200 and transmitted to the controller 30 together with the measurement parameters, or may be calculated by the controller 30. The controller 30 and the robot controlling device 400 can be connected by, for example, a cable and an interface circuit using a photocoupler. The measurement time signal transmitted from the controller 30 can be received by the robot controlling device 400 after a lapse of a transmission delay time τ2 generated in the interface circuit and cable. If, for example, the length of the cable connecting the sensor 100 and the robot controlling device 400 is 10 m, the transmission delay time τ2 is dominated by a transmission delay in the interface circuit, and is, for example, about several tens of µs. In response to the measurement time signal, the robot controlling device 400 obtains the position and attitude (3-$g$) of the sensor 100 in the robot coordinate system.

As described above, the controller 30 transmits the measurement time signal to the robot controlling device 400 at measurement central time. This can synchronize measurement of the position and attitude of the object 500 by the sensor 100 with obtaining of the position and attitude of the sensor 100 by the robot controlling device 400.

The arrangement of the measurement device 700 will be described with reference to FIG. 2. An image captured by the image capturing device 20 is transmitted to the computer 200, and the computer 200 generates a range image based on the image, and detects the position and attitude of the object 500 by performing model fitting. To transmit the image from the image capturing device 20 to the computer 200, the image capturing device 20 and the computer 200 can be connected by, for example, Ethernet. Alternatively, the image capturing device 20 and the computer 200 may be connected by another interface such as Camera Link or USB 3.0.

The position and attitude of the object 500 calculated by the computer 200 are transmitted to the robot controlling device 400 and used as input data to control driving of the robot 300. To transmit the position and attitude of the object 500 from the computer 200 to the robot controlling device 400, the computer 200 and the robot controlling device 400 can be connected by, for example, an interface such as Ethernet.

In the processing device 1, the controller 30 controls a measurement operation based on the set illumination time $T_L$, the set image capturing period $T_E$, and the set difference $\Delta t$ between illumination start time and image capturing start time. Furthermore, the processing device 1 outputs the measurement time signal to the robot controlling device 400 at measurement central time (the midpoint of the measurement period T). This allows the robot controlling device 400 to obtain the position and attitude of the sensor 100 using measurement central time as a reference (trigger). Therefore, it is possible to synchronize measurement of the position and attitude of the object 500 by the sensor 100 with obtaining of the position and attitude of the sensor 100 by the robot controlling device 400.

Second Embodiment

The second embodiment of the present invention will be described below. Matters that are not mentioned as the second embodiment can comply with the first embodiment. The operation of a processing device 1 according to the second embodiment will be described with reference to a timing chart shown in FIG. 4. In the first embodiment, a synchronization error occurs between measurement of the position and attitude of the object 500 by the sensor 100 and obtaining of the position and attitude of the sensor 100 by the robot controlling device 400 due to the transmission delay time τ2 of the measurement time signal. To cope with this, in the second embodiment, a controller 30 outputs a measurement time signal to a robot controlling device 400 a transmission delay time τ2 before the midpoint (measurement central time) of a measurement period T.

The transmission delay time τ2 is caused by a signal delay occurring in an interface circuit and cable between the controller 30 and the robot controlling device 400. Furthermore, a delay (for example, a delay caused by software) from when the robot controlling device 400 receives the measurement time signal until the robot controlling device 400 obtains the position and attitude may be included.

Figure 4:
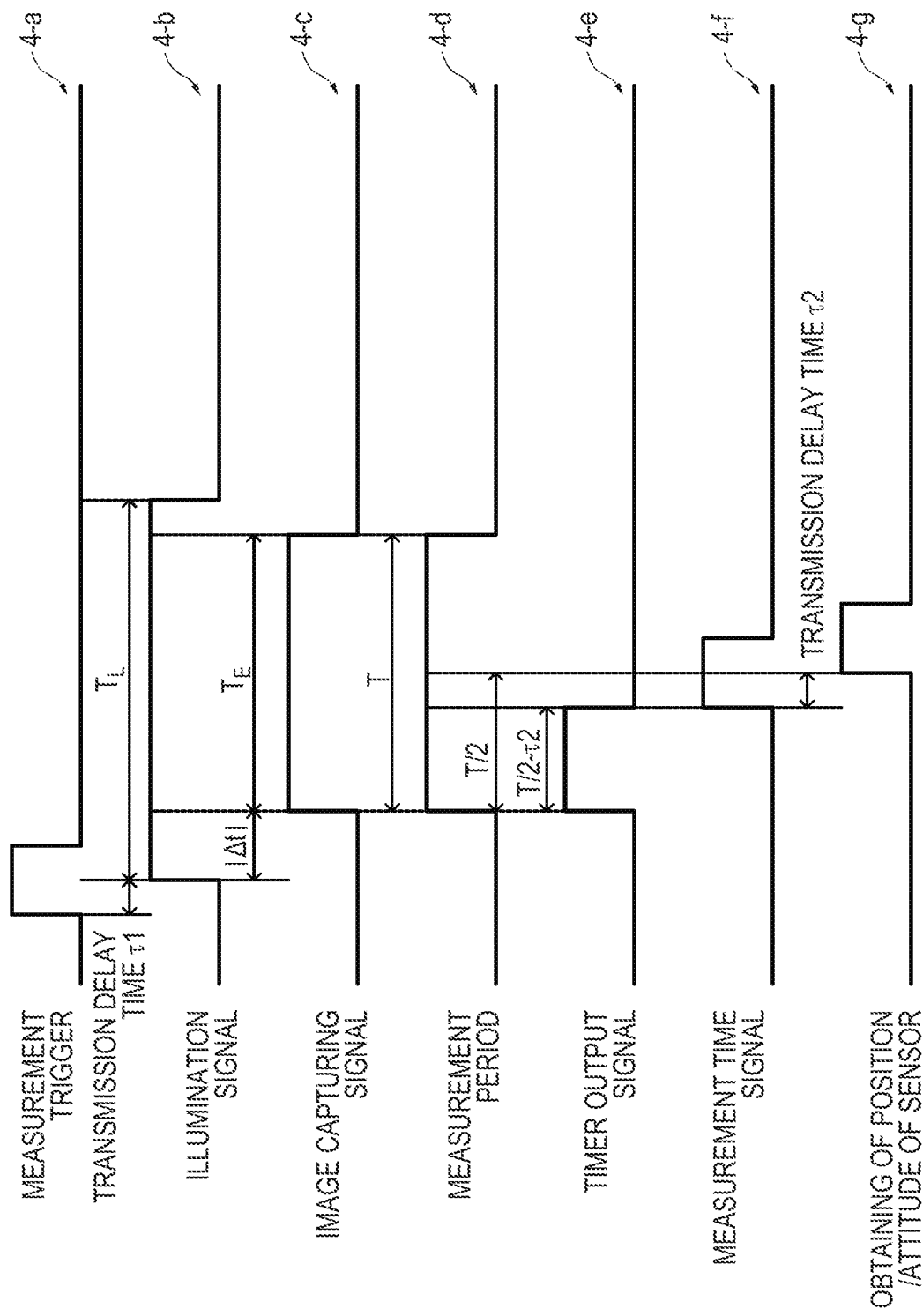
FIG. 4 is a timing chart showing the operation of a processing device according to the second embodiment of the present invention.

As shown in FIG. 4, the controller 30 outputs the measurement time signal to the robot controlling device 400 the transmission delay time τ2 before measurement central time (the midpoint of the measurement period T). That is, the controller 30 measures a period of (T/2−τ2) by a timer after the start of the measurement period T (4-e), and outputs the measurement time signal (4-f) to the robot controlling device 400 at time when the period of (T/2−τ2) elapses. (T/2−τ2) can be calculated using an illumination period $T_L$, an image capturing period $T_E$, a difference $\Delta t$ between illumination start time and image capturing start time, and the transmission delay time τ2 (offset value), by:

$$T/2 - \tau 2 = \begin{cases} T_E/2 - \tau 2 & (\Delta t \geq 0, T_L \geq \Delta t + T_E) \\ (T_L - \Delta t)/2 - \tau 2 & (\Delta t \geq 0, T_L < \Delta t + T_E) \\ (T_E + \Delta t)/2 - \tau 2 & (\Delta t < 0, T_L \geq \Delta t + T_E) \\ T_L/2 - \tau 2 & (\Delta t < 0, T_L < \Delta t + T_E) \end{cases} \quad (4)$$

This can be understood as correction of the timing given by equation (3) using the transmission delay time τ2 (offset value).

Note that the transmission delay time τ2 can be determined based on transmission time at which the controller 30 actually transmits the signal and reception time at which the robot controlling device 400 receives the signal. The transmission delay time τ2 can be preset by the computer 200. Furthermore, (T/2−τ2) may be calculated by the computer 200 and transmitted to the controller 30 together with measurement parameters, or may be calculated by the controller 30 by transmitting τ2 from the computer 200 to the controller 30. According to the second embodiment, it is possible to reduce a synchronization error, as compared to the first embodiment.

As described above, the controller 30 generates a measurement time signal as information indicating a timing obtained by correcting, based on the preset offset value (τ2), a timing (a timing of T/2 after the start of the measurement period T) determined in accordance with the measurement period T.

Third Embodiment

Figure 5:
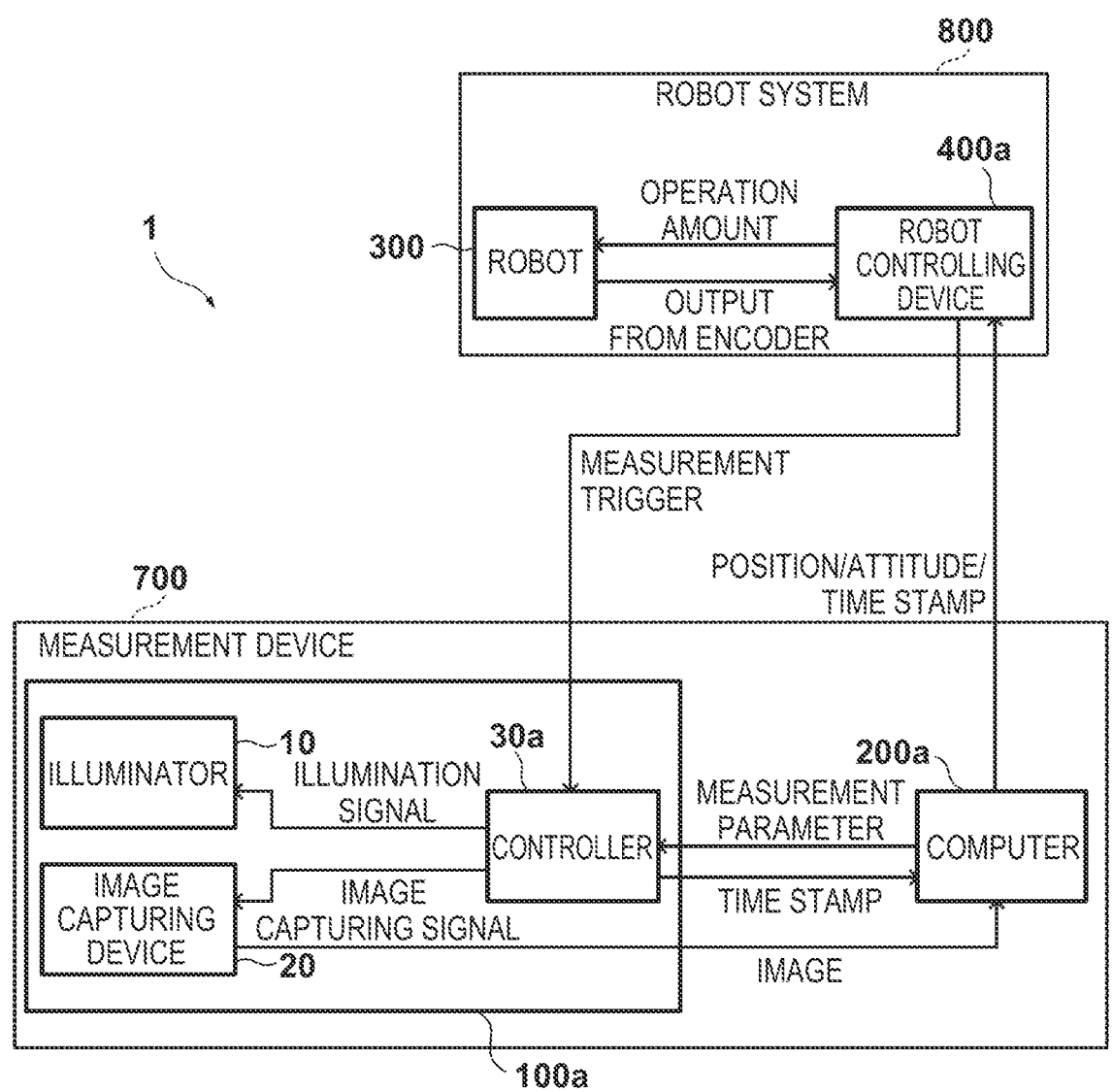
FIG. 5 is a block diagram showing the arrangement of a processing device according to the third embodiment of the present invention.
Figure 6:
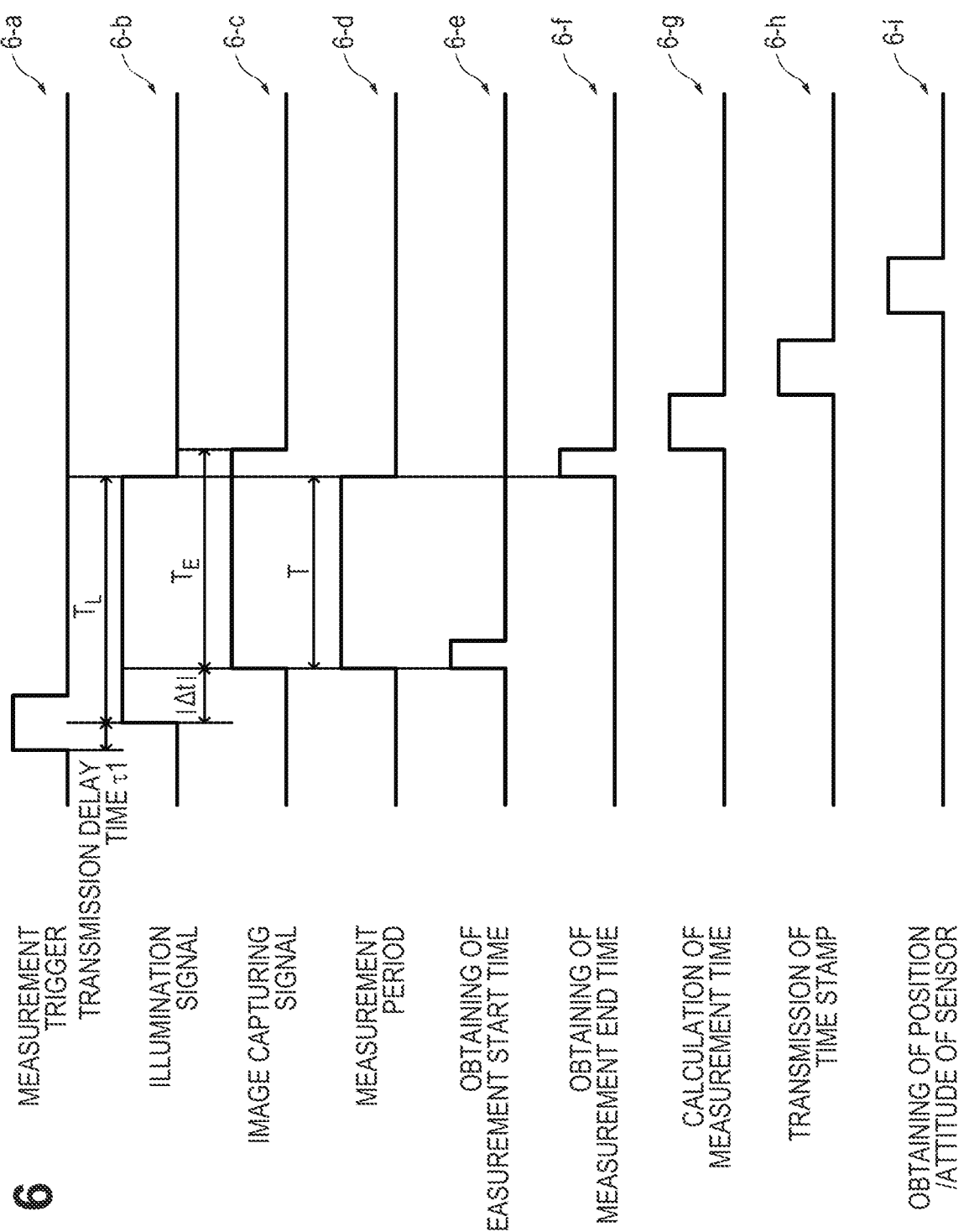
FIG. 6 is a timing chart showing the operation of the processing device according to the third embodiment of the present invention.

The third embodiment of the present invention will be described below. Matters that are not mentioned as the third embodiment can comply with the first embodiment. FIG. 5 shows the arrangement of a processing device 1 according to the third embodiment of the present invention. FIG. 6 shows the operation of the processing device 1 according to the third embodiment of the present invention. In the third embodiment, the sensor 100, the computer 200, and the robot controlling device 400 according to the first embodiment are replaced with a sensor 100a, a computer 200a, and a robot controlling device 400a, respectively. In the sensor 100a, the controller 30 according to the first embodiment is replaced with a controller 30a.

In the third embodiment, a measurement device 700 transmits, to the robot controlling device 400a (a robot system 800), a time stamp (digital data indicating time information) as timing information together with information of the position and attitude of an object 500 in the sensor coordinate system. Upon receiving the time stamp, the robot controlling device 400a obtains the position and attitude of the sensor 100a in the robot coordinate system at time indicated by the time stamp. The robot controlling device 400a can obtain the position and attitude of the sensor 100a based on, for example, the driving profile of a robot 300. Alternatively, the robot controlling device 400a may obtain the position and attitude of the sensor 100a by interpolating the output values of an encoder, that have been obtained at a given sampling interval for driving of a hand 310 of the robot 300. Note that times given by clocks in the measurement device 700 and the robot system 800 desirably coincide with each other. However, the measurement device 700 and the robot system 800 may be configured to recognize a time shift between them.

The third embodiment can be used in, for example, a status in which information indicating the position and attitude of the object 500 in the robot coordinate system is not required in real time. For example, the controller 30a can be configured to start control of illumination by an illuminator 10 and image capturing by an image capturing device 20 in response to a measurement trigger provided from the robot controlling device 400a. Alternatively, the controller 30a can be configured to start control of illumination by the illuminator 10 and image capturing by the image capturing device 20 in response to a measurement trigger provided from the robot controlling device 400a via the computer 200a.

Measurement parameters such as an illumination period $T_L$ and an image capturing period $T_E$ may be set by the computer 200a or the robot controlling device 400a. Alternatively, pre-measurement may be performed prior to measurement of the position and attitude of the object 500, and the sensor 100a may determine and set the measurement parameters based on the result of the pre-measurement. The illumination period $T_L$ and the image capturing period $T_E$ may be changed in accordance with an output from a light amount monitor circuit (not shown) during measurement. Alternatively, it may be configured to continue at least one of an illumination operation and an image capturing operation until specific processing performed during measurement ends. That is, the set illumination period and image capturing period may be different from the actual illumination period and image capturing period. In addition, the illumination period and image capturing period can be changed by various methods.

In order for the robot controlling device 400a to obtain the position and attitude of the sensor 100a at measurement central time (the midpoint of a measurement period T), the controller 30a transmits a time stamp as timing information to the computer 200a. Then, the computer 200a transmits the time stamp to the robot controlling device 400a together with the position and attitude of the object 500 in the sensor coordinate system.

The operation of the processing device 1 according to the third embodiment will be described below with reference to a timing chart shown in FIG. 6. The measurement trigger (6-a) output from the robot controlling device 400a is received by the controller 30a after a lapse of a transmission delay time τ1 generated in an interface circuit and communication path forming an interface between the robot controlling device 400a and the controller 30a. In response to reception of the measurement trigger (6-a), the controller 30a starts control for measurement. More specifically, in response to reception of the measurement trigger (6-a), the controller 30a sets an illumination signal (6-b) to active level for the illumination period $T_L$, and sets an image capturing signal (6-c) to active level for the image capturing period $T_E$.

In the example shown in FIG. 6, the illumination period $T_L$ ends before the end of the image capturing period $T_E$. This control is useful when, in an image readout period (not shown) after the end of the image capturing period $T_E$, noise caused by turning off the illuminator 10 may decrease the S/N ratio of an image output from the image capturing device 20 or distort a transferred image, thereby posing a problem. In the third embodiment, however, the relationship between the illumination period $T_L$ and the image capturing period $T_E$ is not limited to a specific one.

As described above, the measurement period T (6-d) as the overlapping period of the illumination period $T_L$ for causing the illuminator 10 to illuminate the object 500 and the image capturing period $T_E$ (exposure period) for causing the image capturing device 20 to capture the object 500 contributes to measurement of the object 500 in the measurement device 700. Thus, based on the illumination signal (6-b) and the image capturing signal (6-c), the controller obtains measurement start time (6-e) and measurement end time (6-f). This operation can be executed based on, for example, the rise and fall of the AND of the illumination signal (6-b) and the image capturing signal (6-c).

After that, the controller 30a calculates measurement central time (the midpoint of the measurement period T) based on measurement start time and measurement end time (6-g). The controller 30a transmits measurement central time as a time stamp to the computer 200a, and the computer 200a transmits the time stamp to the robot controlling device 400a together with the position and attitude of the object 500 in the sensor coordinate system (6-h). The robot controlling device 400a obtains the position and attitude of the sensor 100a in the robot coordinate system at time indicated by the time stamp (6-i).

Fourth Embodiment

Figure 7:
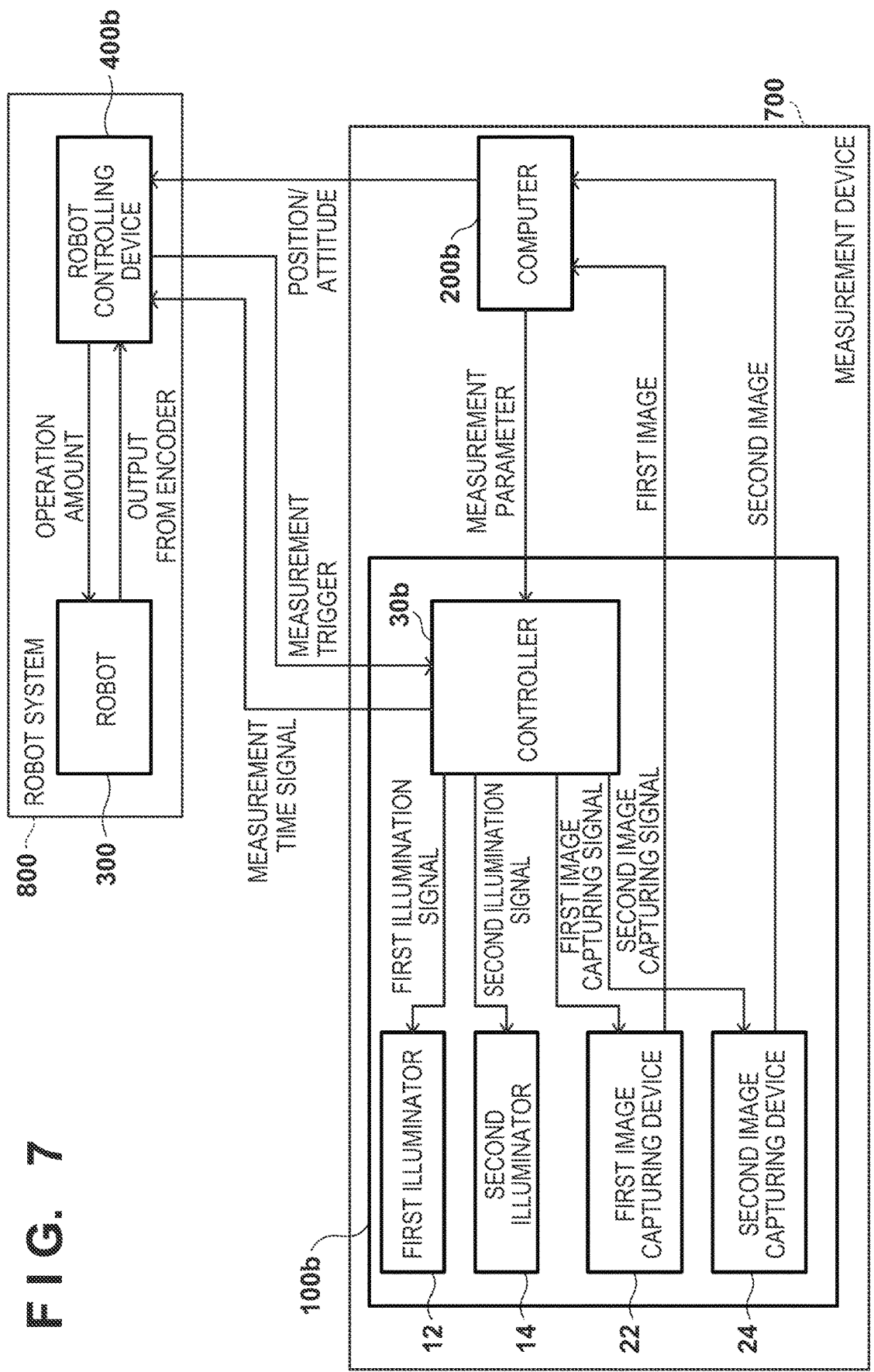
FIG. 7 is a block diagram showing the arrangement of a processing device according to the fourth embodiment of the present invention.
Figure 8:
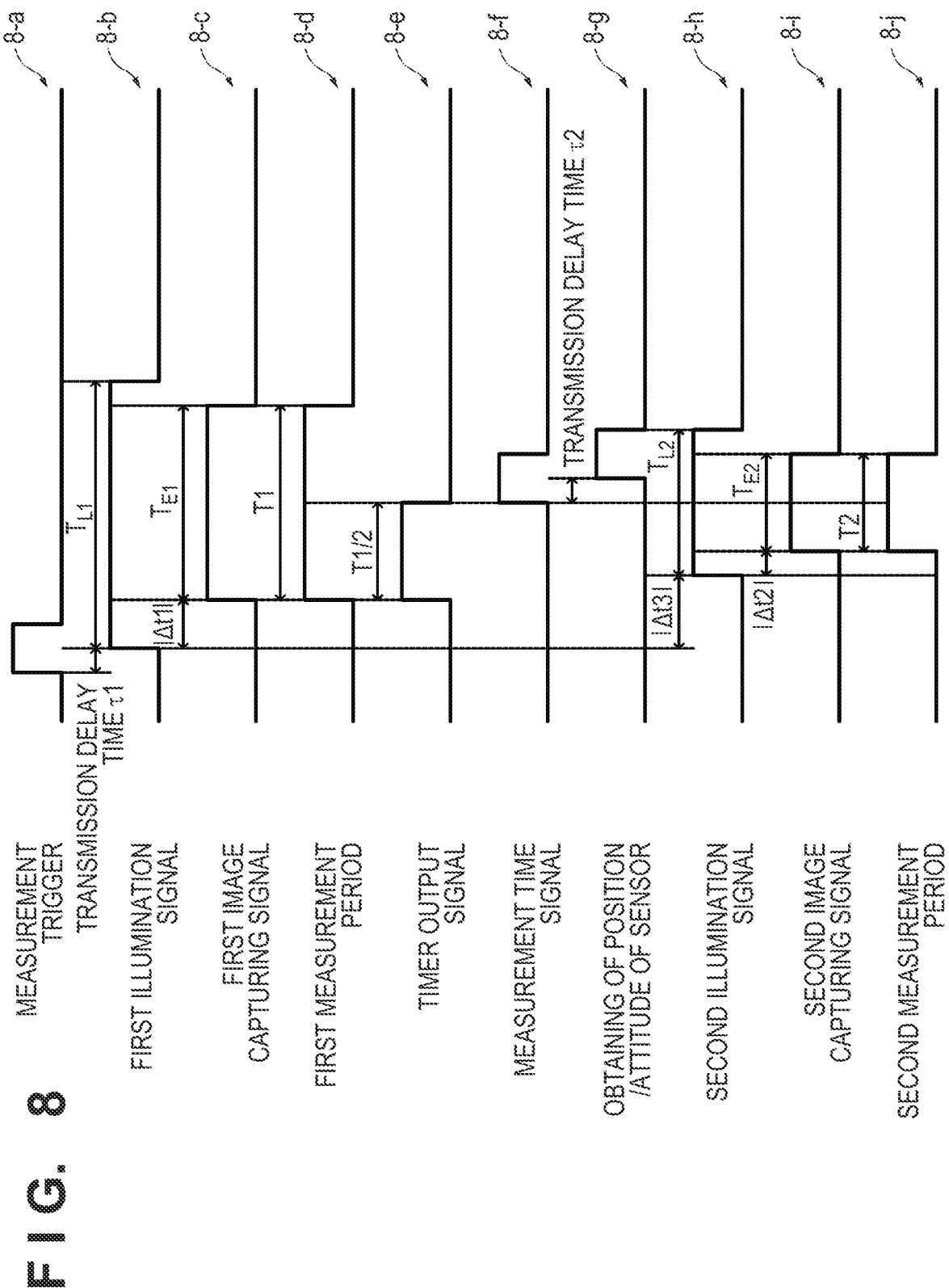
FIG. 8 is a timing chart showing the operation of the processing device according to the fourth embodiment of the present invention.

The fourth embodiment of the present invention will be described below. Matters that are not mentioned as the fourth embodiment can comply with the first embodiment. FIG. 7 shows the arrangement of a processing device 1 according to the fourth embodiment of the present invention. FIG. 8 shows the operation of the processing device 1 according to the fourth embodiment of the present invention. In the fourth embodiment, the sensor 100, the computer 200, and the robot controlling device 400 according to the first embodiment are replaced with a sensor 100b, a computer 200b, and a robot controlling device 400b, respectively. In the sensor 100b, the illuminator 10 according to the first embodiment is replaced with a first illuminator 12 and a second illuminator 14, and the image capturing device 20 according to the first embodiment is replaced with a first image capturing device 22 and a second image capturing device 24. Furthermore, the controller 30 according to the first embodiment is replaced with a controller 30b. The first illuminator 12 illuminates an object 500 with the first illumination light, and the second illuminator 14 illuminates the object 500 with the second illumination light.

In the fourth embodiment, the first set of the first illuminator 12 and the first image capturing device 22 is used to measure the position and attitude of the object 500. Simultaneously with this, the second set of the second illuminator 14 and the second image capturing device 24 is used to measure the position and attitude of the object 500. One of the first and second sets can be used to capture a grayscale image and measure the position and attitude of the object 500 based on the grayscale image. The other one of the first and second sets can be used to generate a range image based on an image obtained by illumination with pattern light and measure the position and attitude of the object 500 based on the range image.

If model fitting is performed for the grayscale image, the estimation accuracy of the position and attitude in the depth direction of the image is not so high. On the other hand, if model fitting is performed for the range image, the estimation accuracy of the position and attitude in the planar direction of the image is not so high. Therefore, a technique of estimating the position and attitude with high accuracy using both the grayscale image and the range image is useful. However, since light amounts necessary for image capturing operations to obtain these images are different from each other, measurement times in the first and second sets may be different from each other. To cope with this, in the fourth embodiment, the controller 30b controls the first and second sets so that the difference between measurement central time in the first set and that in the second set falls within an allowable range, preferably, so that measurement central time in the first set coincides with that in the second set.

The controller 30b controls the first illuminator 12 of the first set by the first illumination signal, and controls the second illuminator 14 of the second set by the second illumination signal. The controller 30b controls the first image capturing device 22 of the first set by the first image capturing signal, and controls the second image capturing device 24 of the second set by the second image capturing signal. The controller 30b controls the first and second illumination signals and the first and second image capturing signals so that measurement central time in the first set coincides with that in the second set. Furthermore, the controller 30b transmits a measurement time signal to the robot controlling device 400b at measurement central time to synchronize measurement of the position and attitude of the object 500 by the sensor 100b with obtaining of the position and attitude of the sensor 100b by the robot controlling device 400b. The measurement time signal is timing information indicating a timing determined in accordance with the first measurement period determined by the first illumination signal and the first image capturing signal and the second measurement period determined by the second illumination signal and the second image capturing signal.

The operation of the processing device 1 according to the fourth embodiment will be described below with reference to a timing chart shown in FIG. 8. A measurement trigger (8-a) output from the robot controlling device 400b is received by the controller 30b after a lapse of a transmission delay time τ1 generated in an interface circuit and communication path forming an interface between the robot controlling device 400b and the controller 30b. In response to reception of the measurement trigger (8-a), the controller 30b starts control for measurement. More specifically, in response to reception of the measurement trigger (8-a), the controller 30b sets the first illumination signal (8-b) to active level for a first illumination period $T_{L1}$, and sets the first image capturing signal (8-c) to active level for a first image capturing period $T_{E1}$. In response to reception of the measurement trigger (8-a), the controller 30b sets the second illumination signal (8-h) to active level for a second illumination period $T_{L2}$, and sets the second image capturing signal (8-i) to active level for a second image capturing period $T_{E2}$.

Let Δt1 be the difference between the timing of causing the first illumination signal to transit to active level and the timing of causing the first image capturing signal to transit to active level, and Δt2 be the difference between the timing of causing the second illumination signal to transit to active level and the timing of causing the second image capturing signal to transit to active level. The first illumination period $T_{L1}$, the second illumination period $T_{L2}$, the first image capturing period $T_{E1}$, the second image capturing period $T_{E2}$, the differences Δt1 and Δt2 between illumination start times and image capturing start times are preset as measurement parameters.

A first measurement period T1 as the overlapping period of the first illumination period $T_{L1}$ for causing the first illuminator 12 to illuminate the object 500 and the first image capturing period $T_{E1}$ for causing the first image capturing device 22 to capture the object 500 contributes to measurement of the object 500 using the first set. A second measurement period T2 as the overlapping period of the second illumination period $T_{L2}$ for causing the second illuminator 14 to illuminate the object 500 and the second image capturing period $T_{E2}$ for causing the second image capturing device 24 to capture the object 500 contributes to measurement of the object 500 using the second set. The controller 30b controls the first and second sets so that measurement central time in the first set coincides with that in the second set. In the example shown in FIG. 8, the controller 30b provides a time difference Δt3 between start time of the first illumination signal and that of the second illumination signal. The time difference Δt3 can be calculated using the differences Δt and Δt2 between illumination start times and image capturing start times, and the first and second measurement periods T1 and T2, by:

$$\Delta t3 = |(|\Delta t1| + T1/2) - (|\Delta t2| + T2/2)| \quad (5)$$

wherein T1/2 can be calculated using the illumination period $T_{L1}$, the image capturing period $T_{E1}$, and the difference Δt1 between illumination start time and image capturing start time, by:

$$T1/2 = \begin{cases} T_{E1}/2 & (\Delta t1 \geq 0, T_{L1} \geq \Delta t1 + T_{E1}) \\ (T_{L1} - \Delta t1)/2 & (\Delta t1 \geq 0, T_{L1} < \Delta t1 + T_{E1}) \\ (T_{E1} + \Delta t1)/2 & (\Delta t1 < 0, T_{L1} \geq \Delta t1 + T_{E1}) \\ T_{L1}/2 & (\Delta t1 < 0, T_{L1} < \Delta t1 + T_{E1}) \end{cases} \quad (6)$$

Similarly, T2/2 can be calculated using the illumination period $T_{L2}$, the image capturing period $T_{E2}$, and the difference Δt2 between illumination start time and image capturing start time, by:

$$T2/2 = \begin{cases} T_{E2}/2 & (\Delta t1 \geq 0, T_{L2} \geq \Delta t1 + T_{E2}) \\ (T_{L2} - \Delta t1)/2 & (\Delta t1 \geq 0, T_{L2} < \Delta t1 + T_{E2}) \\ (T_{E2} + \Delta t1)/2 & (\Delta t1 < 0, T_{L2} \geq \Delta t1 + T_{E2}) \\ T_{L2}/2 & (\Delta t1 < 0, T_{L2} < \Delta t1 + T_{E2}) \end{cases} \quad (7)$$

Δt3, T1/2, and T2/2 may be calculated by the computer 200b and transmitted to the controller 30b together with the measurement parameters, or may be calculated by the controller 30b. The controller 30b measures a period of T1/2 by a timer after the start of the measurement period (8-e), and outputs the measurement time signal to the robot controlling device 400b at time when the period of T1/2 elapses. Note that the timer for measuring the period of T1/2 can be configured to, for example, operate by the AND of the first illumination signal and the first image capturing signal. The measurement time signal can be received by the robot controlling device 400b after a lapse of a transmission delay time τ2 generated in the interface circuit and cable. In response to the measurement time signal, the robot controlling device 400b obtains the position and attitude (8-g) of the sensor 100b in the robot coordinate system. Note that according to the method described in the second embodiment, a synchronization error occurring due to the transmission delay time τ2 may be reduced.

As described above, by determining an operation timing according to equation (5), measurement central time in the first set can be made to coincide with that in the second set. Furthermore, by transmitting the measurement time signal to the robot controlling device 400b at measurement central time, it is possible to synchronize measurement of the position and attitude of the object 500 by the sensor 100b with obtaining of the position and attitude of the sensor 100b by the robot controlling device 400b.

Images captured by the first illuminator 12 and the second illuminator 14 are transmitted to the computer 200b, and the computer 200b calculates the position and attitude of the object 500 in the sensor coordinate system based on these images. In the fourth embodiment, to synchronize measurement of the position and attitude of the object 500 by the sensor 100b with obtaining of the position and attitude of the sensor 100b by the robot controlling device 400b, the controller 30b outputs the measurement time signal to the robot controlling device 400b. However, as in the third embodiment, the controller 30b may output a time stamp to the robot controlling device 400b.

In the fourth embodiment, the two sets of the illuminators and image capturing devices are provided. However, three or more sets may be provided. In this case as well, control is performed so that the difference between measurement central times in the three or more sets falls within an allowable range, preferably, so that measurement central times in the three or more sets coincide with each other. Furthermore, timing information (measurement time information) indicating a timing determined in accordance with measurement central time can be output.

Fifth Embodiment

Figure 9:
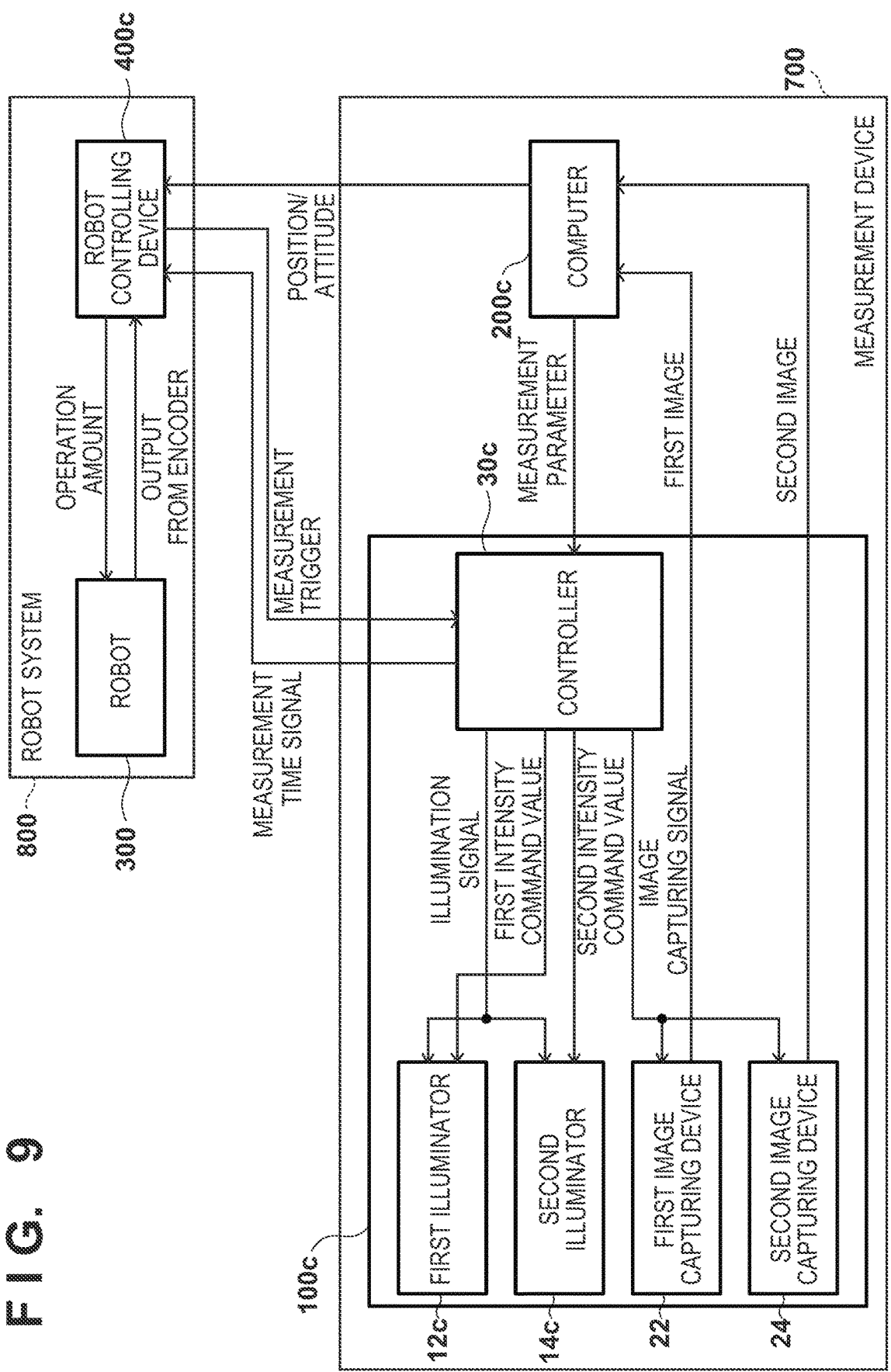
FIG. 9 is a block diagram showing the arrangement of a processing device according to the fifth embodiment of the present invention.

The fifth embodiment of the present invention will be described below. Matters that are not mentioned as the fifth embodiment can comply with the fourth embodiment. FIG. 9 shows the arrangement of a processing device 1 according to the fifth embodiment of the present invention. In the fifth embodiment, the sensor 100b, the computer 200b, and the robot controlling device 400b according to the fourth embodiment are replaced with a sensor 100c, a computer 200c, and a robot controlling device 400c, respectively. In the sensor 100c, the first illuminator 12 and the second illuminator 14 according to the fourth embodiment are replaced with a first illuminator 12c and a second illuminator 14c, respectively. The first illuminator 12c illuminates an object 500 with the first illumination light, and the second illuminator 14c illuminates the object 500 with the second illumination light.

In the fifth embodiment, the first set of the first illuminator 12c and a first image capturing device 22c is used to measure the position and attitude of the object 500. Simultaneously with this, the second set of the second illuminator 14c and a second image capturing device 24c is used to measure the position and attitude of the object 500. One of the first and second sets can be used to capture a grayscale image and measure the position and attitude of the object 500 based on the grayscale image. The other one of the first and second sets can be used to generate a range image based on an image obtained by illumination with pattern light and measure the position and attitude of the object 500 based on the range image.

In the fourth embodiment, the timings of the first and second illumination signals and the first and second image capturing signals are controlled so that the difference between measurement central time in the first set and that in the second set falls within an allowable range, preferably, so that measurement central time in the first set coincides with that in the second set. On the other hand, in the fifth embodiment, the measurement period of the first set is made to match the measurement period of the second set, thereby making measurement central time in the first set coincide with that in the second set. In accordance with the measurement period, the intensity of the first illumination light and that of the second illumination light are determined. The intensity of the first illumination light is controlled by the first intensity command value sent to the first illuminator 12c by a controller 30c, and the intensity of the second illumination light is controlled by the second intensity command value sent to the second illuminator 14c by the controller 30c.

The controller 30c controls the first illuminator 12 of the first set and the second illuminator 14 of the second set by a common illumination signal. Furthermore, the controller 30c controls the first image capturing device 22 of the first set and the second image capturing device 24 of the second set by a common image capturing signal.

As an example, consider a case in which, as recommended conditions, a recommended illumination period by the first illuminator 12c is 20 ms, a recommended illumination period by the second illuminator 14c is 15 ms, a recommended image capturing period by the first image capturing device 22 is 15 ms, and a recommended image capturing period by the second image capturing device 24 is 10 ms. Assume that each of recommended intensity command values for the first illuminator 12c and second illuminator 14c is 50%. Assume also that a recommended measurement period by the first illuminator 12c and the first image capturing device 22 and that by the second illuminator 14c and the second image capturing device 24 are 15 ms and 10 ms, respectively.

In this example, consider a case in which under a policy of setting a shorter common illumination period and a shorter common image capturing period, the common illumination period, the common image capturing period, and the common measurement time are set to 15 ms, 10 ms, and 10 ms, respectively. In this case, the light amount of an image obtained by the first image capturing device 22 of the first set decreases to ⅔ of a light amount obtained under the recommended conditions, and the light amount of an image obtained by the second image capturing device 24 of the second set is equal to the light amount obtained under the recommended conditions. To compensate for the decrease amount, the first intensity command value for the first illuminator 12c is changed from the recommended intensity command value of 50% to 75%. Furthermore, as for the second intensity command value for the second illuminator 14c, the recommended intensity command value of 50% is maintained. This can make measurement central time in the first set coincide with that in the second set.

To synchronize measurement of the position and attitude of the object 500 by the sensor 100c with obtaining of the position and attitude of the sensor 100c by the robot controlling device 400c, the controller 30c transmits the measurement time signal to the robot controlling device 400c at measurement central time. Instead of outputting the measurement time signal from the controller 30c to the robot controlling device 400c, the controller 30c may output a time stamp to the robot controlling device 400c, as in the third embodiment.

In the fifth embodiment, the two sets of the illuminators and image capturing devices are provided. However, three or more sets may be provided. In this case as well, measurement central times in the three or more sets can be made to coincide with each other.

Sixth Embodiment

Figure 10:
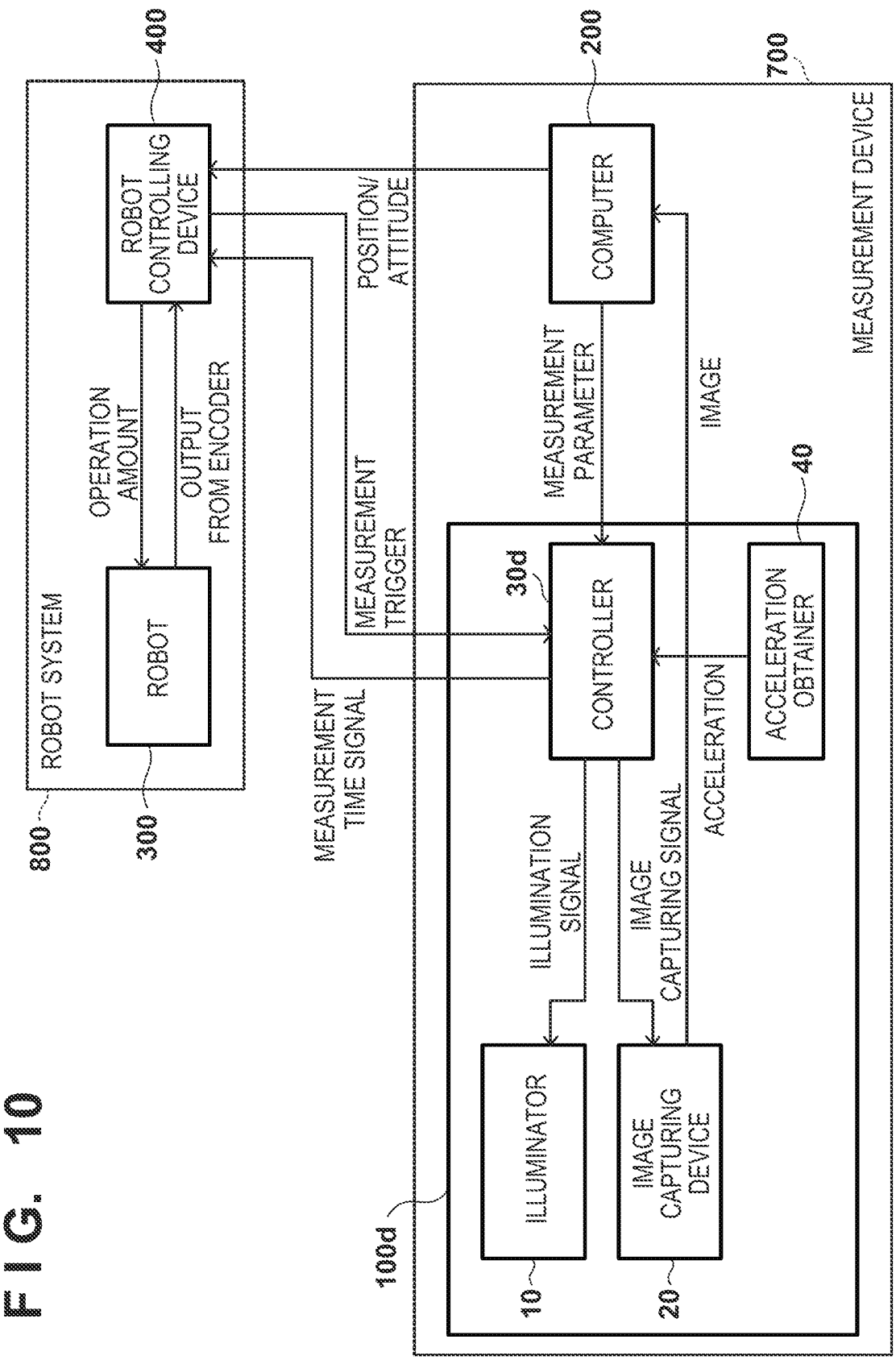
FIG. 10 is a block diagram showing the arrangement of a processing device according to the sixth embodiment of the present invention.

The sixth embodiment of the present invention will be described below. Matters that are not mentioned as the sixth embodiment can comply with the first embodiment. FIG. 10 shows the arrangement of a processing device 1 according to the sixth embodiment of the present invention. In the sixth embodiment, the sensor 100 according to the first embodiment is replaced with a sensor 100d. In the sensor 100d, the controller 30 according to the first embodiment is replaced with a controller 30d, and an acceleration obtainer 40 is added. The acceleration obtainer 40 obtains the acceleration of the sensor 100d (an illuminator 10 and an image capturing device 20).

In the first to fifth embodiments, the position and attitude of the object 500 are measured on the assumption that the hand 310 of the robot 300 moves at a constant speed. However, the hand 310 of the robot 300 may make an acceleration motion. The acceleration motion includes an acceleration motion that increases the speed and an acceleration motion (deceleration motion) that decreases the speed. In the sixth embodiment, even if a hand 310 (the sensor 100*d*) of a robot 300 makes an acceleration motion, a synchronization error occurring between measurement of the position and attitude of an object 500 and obtaining of the position and attitude of the sensor 100*d* is reduced. In the sixth embodiment, the controller 30*d* outputs timing information (measurement central time) in accordance with the acceleration of the sensor 100*d* (illuminator 10 and image capturing device 20) in addition to a measurement period. The acceleration of the sensor 100*d* is obtained by the acceleration obtainer 40.

If the absolute value of the acceleration output from the acceleration obtainer 40 is smaller than a threshold, that is, it can be considered that the sensor 100*d* makes a uniform motion, the controller 30*d* can output measurement central time as timing information. However, if the absolute value of the acceleration output from the acceleration obtainer 40 is larger than the threshold, that is, it cannot be considered that the sensor 100*d* makes a uniform motion, a synchronization error may occur by obtaining the position and attitude of the sensor 100*d* at measurement central time.

For example, in the active stereo method in which an object is illuminated with pattern light, after performing processing such as center-of-gravity detection or peak detection for the luminance value of a pattern image in a captured image, a range image can be calculated. Therefore, if image capturing is performed in a state in which the sensor 100*d* makes an acceleration motion, the pattern image in the captured image is distorted. Thus, the detected center of gravity or peak position becomes close to a position on the measurement start position side with respect to the midpoint of the measurement period at the time of acceleration to increase the speed, and becomes close to a position on the measurement end position side at the time of acceleration (deceleration) to decrease speed.

In consideration of this, to reduce a synchronization error caused by the acceleration motion of the sensor 100*d*, a method of measuring the position and attitude of the object 500 only when the absolute value of the acceleration is smaller than the threshold is useful. Alternatively, to reduce a synchronization error caused by the acceleration motion of the sensor 100*d*, a method of adjusting the timing of obtaining the position and attitude of the sensor 100*d* in accordance with the acceleration is useful.

Figure 11:
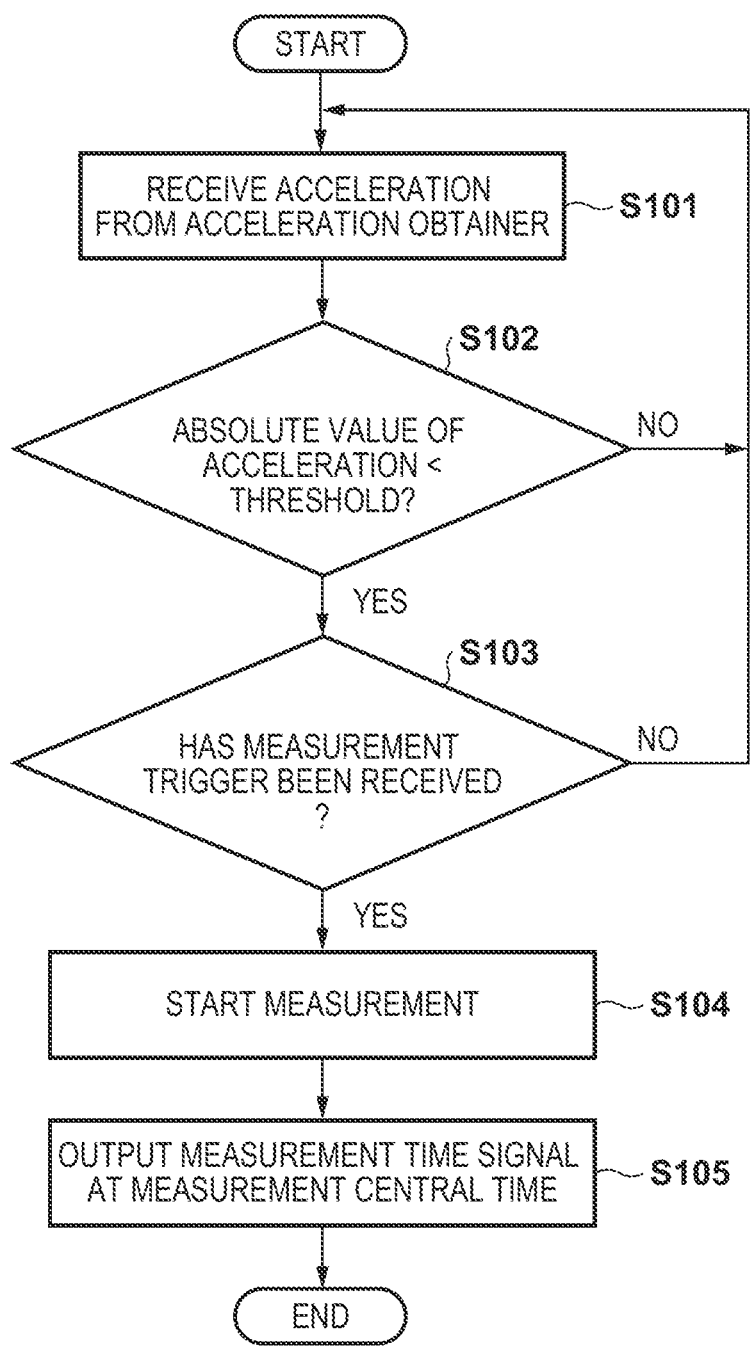
FIG. 11 is a flowchart illustrating one operation of the processing device according to the sixth embodiment of the present invention.

An operation of measuring the position and attitude of the object 500 only when the absolute value of the acceleration is smaller than the threshold will be described with reference to FIG. 11. In step S101, the controller 30*d* obtains the acceleration from the acceleration obtainer 40. At this time, the acceleration obtainer 40 obtains an acceleration profile held by a robot controlling device 400, and obtains the acceleration of the sensor 100*d* (hand 310) based on the acceleration profile. The acceleration obtainer 40 may obtain, from the robot controlling device 400, an acceleration detected by an acceleration sensor provided in the hand 310. Alternatively, the acceleration obtainer 40 can include an acceleration sensor to obtain the acceleration of the sensor 100*d* (hand 310) based on an output from the acceleration sensor.

In step S102, the controller 30*d* determines whether the absolute value of the acceleration obtained in step S101 is smaller than a preset threshold. If the absolute value is smaller than the threshold, the process advances to step S103; otherwise, the process returns to step S101. Steps S101 and S102 are understood as processing that advances to step S103 after the absolute value of the acceleration becomes smaller than threshold. In step S103, the controller 30*d* determines whether a measurement trigger has been received from the robot controlling device 400. If the measurement trigger has been received, the process advances to step S104; otherwise, the process returns to step S101. The threshold can be determined based on an allowable synchronization error by measuring, in advance, the position and attitude of the object 500 using the acceleration as a parameter.

In step S104, the controller 30*d* starts control for measurement. The processing for measurement can comply with, for example, the first embodiment. For example, the controller 30*d* sets an illumination signal to active level, and also sets an image capturing signal to active level. In step S105, the controller 30*d* outputs a measurement time signal (timing signal) at measurement central time.

Step S103 may be executed before step S101. In this case, if a measurement trigger is received, steps S101 and S102 are executed. If it is determined in step S102 that the absolute value of the acceleration is smaller than the threshold, step S104 is executed.

Figure 12:
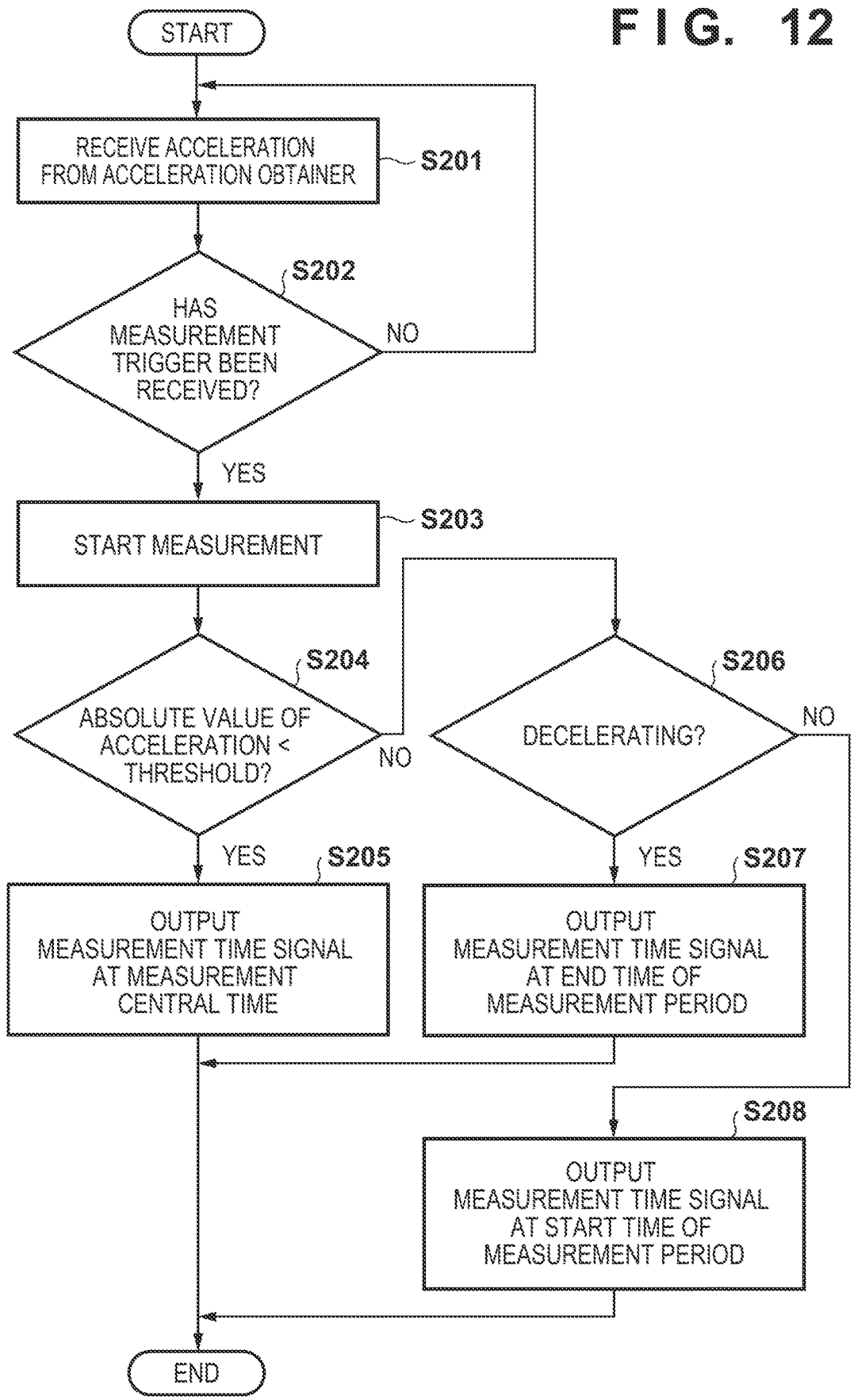
FIG. 12 is a flowchart illustrating another operation of the processing device according to the sixth embodiment of the present invention.

An operation of adjusting the timing of obtaining the position and attitude of the sensor 100*d* in accordance with the acceleration will be described with reference to FIG. 12. In step S201, the controller 30*d* obtains the acceleration from the acceleration obtainer 40. In step S202, the controller 30*d* determines whether a measurement trigger has been received from the robot controlling device 400. If the measurement trigger has been received, the process advances to step S203; otherwise, the process returns to step S201. Note that step S202 may be executed before step S201. In this case, if a measurement trigger is received, step S201 can be executed.

In step S203, the controller 30*d* starts control for measurement. Processing for measurement can comply with, for example, the first embodiment. For example, the controller 30*d* sets the illumination signal to active level, and also sets the image capturing signal to active level.

In step S204, it is determined whether the absolute value of the acceleration obtained in step S201 is smaller than a preset threshold. If the absolute value is smaller than the threshold, the process advances to step S205; otherwise, the process advances to step S206. If the absolute value of the acceleration is smaller than the preset threshold, the controller 30*d* outputs, in step S205, the measurement time signal (timing signal) at measurement central time.

If the absolute value of the acceleration is larger than the preset threshold, the controller 30*d* determines in step S206 whether the acceleration decreases the speed. If the acceleration decreases the speed, the process advances to step S207. If the acceleration increases the speed, the process advances to step S208.

If the acceleration decreases the speed, the controller 30*d* outputs, in step S207, as timing information, information indicating a timing (for example, the end timing of the measurement period) after the midpoint of the measurement period. More specifically, the controller 30*d* can be configured to output a measurement time signal at a timing after the midpoint of the measurement period.

On the other hand, if the acceleration increases the speed, the controller 30*d* outputs, in step S208, as timing information, information indicating a timing (for example, the start timing of the measurement period) before the midpoint of the measurement period. More specifically, the controller 30d can be configured to output the measurement time signal at a timing before the midpoint of the measurement period.

The threshold used for determination in step S204 can be set to an acceleration that shifts the center of gravity or peak of the pattern image in the captured image from the center of the pattern image width by ¼ of the pattern image width, by measuring, in advance, the position and attitude of the object 500 using the acceleration as a parameter.

In the above example, the output timing (timing information) of the measurement time signal is determined in accordance with each of a case in which the acceleration has an absolute value smaller than the threshold, a case in which the acceleration decreases the speed, and a case in which the acceleration increases the speed. To more finely control the output timing of the measurement time signal, the acceleration may be divided into a plurality of ranges, and the output timing (timing information) of the measurement time signal may be determined in accordance with which of the plurality of ranges the detected acceleration belongs to. A division number can be determined in consideration of an allowable synchronization error, the degree of influence of the acceleration on the result of measuring the position and attitude (that is, an algorithm for measuring the position and attitude), or the like.

The timing of measuring the position and attitude of the object 500 may be adjusted based on a speed obtained by integrating the acceleration, instead of the acceleration. Alternatively, the timing of obtaining the position and attitude of the sensor 100d may be adjusted based on the speed and acceleration. For example, if the speed and acceleration exceeding the field of view of the sensor 100d are detected during the measurement period, an error may occur in measurement of the position and attitude of the object 500. To cope with this, if such speed and acceleration are detected, it may be configured not to measure the position and attitude of the object 500. Alternatively, if such speed and acceleration are detected, it may be configured to adjust the timing of obtaining the position and attitude of the sensor 100d in consideration of the error.

In the above embodiment, the measurement device 700 is fixed to the hand 310 of the robot 300, and moves together with the hand 310. The present invention is applicable to a case in which the relative position (and relative acceleration) between the measurement device 700 and the object 500 changes when the object 500 moves. In this case, for example, a moving mechanism for moving the object 500 can be provided in place of the robot system 800. The moving mechanism can include, for example, a movable member such as a stage that moves together with the object 500, and a movable member controlling device that controls the movement of the movable member. In this case, the controller 30d can be configured to output timing information in accordance with information of the acceleration of the object 500 (movable member) that can be provided from the movable member controlling device, in addition to the measurement period.

[Supplement]

It is also possible to decrease communication lines by providing a hub mounted in the sensor, such as an Ethernet@ switching hub, between the sensor and the computer, and time-divisionally transmitting/receiving measurement parameters and images.

[Article Manufacturing Method]

An object 500 shown in FIG. 1 can be a part for manufacturing (working) an article. The part is processed (for example, worked, assembled, held, or moved) by a robot 300. The robot 300 is controlled by a robot controlling device 400. The robot controlling device 400 receives information of the position and attitude of the object 500 from a measurement device 700, and controls the operation of the robot 300 based on the information. A processing device 1 can be formed as a manufacturing device that measures the position (or the position and attitude) of the object 500 by the measurement device 700, processes the object 500 by a robot system 800 based on the measurement result, and manufactures an article including the object 500.

An article manufacturing method performed by the processing device 1 manufactures an article while operating, based on the measurement result of the measurement device 700, the robot 300 to which the measurement device 700 is attached. The article manufacturing method can include a measurement step of measuring the position (or the position and attitude) of the object 500 (part) by the measurement device 700, and a control step of controlling the robot 300 based on the position (or the position and attitude) obtained in the measurement step. Control of the robot 300 in the control step includes control for processing an object. This processing can include at least one of, for example, working, cutting, conveyance, assembly, examination, and selection. The article manufacturing method according to this embodiment is superior to a conventional method in at least one of the performance, quality, productivity, and production cost of the article.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-045249, filed Mar. 9, 2017, which is hereby incorporated by reference herein in its entirety.

What is claimed is:

1. A measurement device comprising:
   a sensor including an illuminator configured to illuminate an object and an image capturing device configured to capture an image of the object illuminated by the illuminator; and
   a sensor controller configured to obtain a position of the object by controlling the illuminator and the image capturing device, the sensor being attached to a robot and moving with the robot,
   wherein the sensor controller is configured to output a signal which causes a robot controlling device configured to control the robot to obtain positional information of the sensor, during a measurement period that is an overlapping period of an illumination period for causing the illuminator to illuminate the object and an image capturing period for causing the image capturing device to capture the image of the object, and
   wherein the sensor controller is configured to obtain the position of the object based on the image of the object obtained by the image capturing device and the positional information of the sensor obtained by the robot controlling device.

2. The device according to claim 1, wherein the sensor controller sends an illumination signal indicating the illumination period to the illuminator, and sends an image capturing signal indicating the image capturing period to the image capturing device, and wherein the sensor controller generates the signal which causes the robot controlling device to obtain the positional information of the sensor, in accordance with the illumination signal and the image capturing signal.

3. The device according to claim 2, wherein the illumination period is different from the image capturing period.

4. The device according to claim 1, wherein the signal which causes the robot controlling device to obtain the positional information of the sensor is generated in accordance with an acceleration of the sensor.

5. The device according to claim 4, wherein the sensor controller obtains the acceleration based on information obtained from the robot controlling device.

6. The device according to claim 4, further comprising an acceleration sensor,
   wherein the sensor controller obtains the acceleration of the sensor based on an output from the acceleration sensor.

7. The device according to claim 1, wherein the sensor controller outputs the signal which causes the robot controlling device to obtain the positional information of the sensor in accordance with an acceleration of the object, in the measurement period.

8. The device according to claim 7, wherein the sensor controller obtains the acceleration based on information obtained from a controller configured to control movement of the object.

9. The device according to claim 4, wherein in a case where the acceleration is for increasing speed, the sensor controller outputs the signal which causes the robot controlling device to obtain the positional information of the sensor before a midpoint of the measurement period, and in a case where the acceleration is for decreasing speed, the sensor controller outputs the signal which causes the robot controlling device to obtain the positional information of the sensor after the midpoint of the measurement period.

10. The device according to claim 4, wherein in a case where an absolute value of the acceleration is smaller than a threshold, the sensor controller outputs the signal which causes the robot controlling device to obtain the positional information of the sensor at a timing corresponding to a midpoint of the measurement period.

11. The device according to claim 4, wherein in a case where an absolute value of the acceleration is smaller than a threshold, the sensor controller operates the illuminator and the image capturing device so that the object is captured.

12. The device according to claim 11, wherein in a case where the absolute value of the acceleration is larger than the threshold, the sensor controller does not operate the illuminator and the image capturing device.

13. The device according to claim 4, wherein in a case where an absolute value of the acceleration is smaller than a threshold, the sensor controller operates the illuminator and the image capturing device so that the object is captured in response to reception of a measurement trigger provided from the robot controlling device.

14. The device according to claim 1, wherein the signal which causes the robot controlling device to obtain the positional information of the sensor is a pulse signal.

15. The device according to claim 1, wherein the signal which causes the robot controlling device to obtain the positional information of the sensor includes data indicating time information.

16. The device according to claim 1, wherein the sensor controller generates, as the signal which causes the robot controlling device to obtain the positional information of the sensor, information indicating a timing obtained by correcting, based on a preset offset value, a timing determined in accordance with at least the measurement period.

17. The device according to claim 1, wherein
   a first illuminator configured to illuminate the object with first illumination light and a second illuminator configured to illuminate the object with second illumination light are provided as the illuminator, and a first image capturing device configured to capture the object illuminated with the first illumination light and a second image capturing device configured to capture the object illuminated with the second illumination light are provided as the image capturing device, and
   a measurement timing in the first illuminator and the first image capturing device and a measurement timing in the second illuminator and the second image capturing device are determined so that a difference between measurement central time in the first illuminator and the first image capturing device and measurement central time in the second illuminator and the second image capturing device falls within an allowable range.

18. The device according to claim 1, wherein
   a first illuminator configured to illuminate the object with first illumination light and a second illuminator configured to illuminate the object with second illumination light are provided as the illuminator, and a first image capturing device configured to capture the object illuminated with the first illumination light and a second image capturing device configured to capture the object illuminated with the second illumination light are provided as the image capturing device, and
   a measurement timing in the first illuminator and the first image capturing device, a measurement timing in the second illuminator and the second image capturing device, an intensity of the first illumination light, and an intensity of the second illumination light are determined so that a difference between measurement central time in the first illuminator and the first image capturing device and measurement central time in the second illuminator and the second image capturing device falls within an allowable range.

19. A processing device comprising:
a robot including a hand configured to hold the object and an arm configured to move the hand;
a robot controlling device configured to control the robot; and
a measurement device defined by claim 1,
wherein the sensor of the measurement device is attached to the hand, and
the robot controlling device controls the robot based on a measurement result of the measurement device and positional information of the sensor attached to the hand.

20. An article manufacturing method of manufacturing an article while operating, based on a measurement result of a measurement device defined by claim 1, a robot to which the measurement device is attached, the method comprising:
measuring a position of an object by the measurement device; and
controlling the robot based on the position obtained in the measuring.

21. A processing device comprising a measurement device configured to measure a position of an object, and a robot controlling device configured to control a robot, which is configured to process the object, based on a measurement result of the measurement device,
wherein the measurement device comprises: a sensor including an illuminator configured to illuminate an object and an image capturing device configured to capture an image of the object illuminated by the illuminator; and a sensor controller configured to obtain the image of the object by controlling the illuminator and the image capturing device, the image of the object being used for measuring a position of the object, the sensor being attached to the robot and moving with the robot
wherein the sensor controller is configured to output a signal which causes the robot controlling device to obtain positional information of the sensor, during a measurement period that is an overlapping period of an illumination period for causing the illuminator to illuminate the object and an image capturing period for causing the image capturing device to capture the image of the object,
wherein the robot controlling device configured to obtain the positional information of the sensor in accordance with the signal which causes the robot controlling device to obtain the positional information of the sensor;
wherein the sensor controller is configured to obtain the position of the object based on the image of the object obtained by the sensor and the positional information of the sensor obtained by the robot controlling device; and
wherein the robot controlling device is configured to control the robot based the position of the object obtained by the sensor controller.

22. The device according to claim 21, wherein the robot includes a hand configured to hold the object and an arm configured to move the hand, and
wherein the robot controlling device is configured to control the hand so as to hold the object, based on the positional information of the object obtained by the sensor controller.

23. A robot system comprising a robot configured to process an object based on a position of the object measured by a measurement device, and a robot controlling device configured to control the robot, the measurement device comprising a sensor including an illuminator configured to illuminate the object and an image capturing device configured to capture an image of the object illuminated by the illuminator; and a sensor controller configured to obtain the position of the object by controlling the illuminator and the image capturing device,
wherein the robot controlling device is configured to obtain positional information of the sensor which is attached to the robot, while the robot moves with the sensor, in accordance with a signal which is provided from the measurement device during a measurement period that is an overlapping period of an illumination period for causing the illuminator to illuminate the object and an image capturing period for causing the image capturing device to capture the image of the object, and
wherein the robot controlling device is configured to control the robot based on the position of the object which is obtained based on the image of the object obtained by the sensor and the positional information of the sensor.

24. A measurement device comprising:
a sensor including an illuminator configured to illuminate an object and an image capturing device configured to capture an image of the object illuminated by the illuminator; and
a sensor controller configured to obtain a position of the object by controlling the illuminator and the image capturing device, the sensor being attached to a robot and moving with the robot,
wherein the sensor controller is configured to output a signal which causes a robot controlling device configured to control the robot to obtain positional information of the sensor, and
wherein the sensor controller is configured to obtain the position of the object based on the image of the object obtained by the image capturing device and the positional information of the sensor obtained by the robot controlling device.

25. A processing device comprising a measurement device configured to measure a position of an object, and a robot controlling device configured to control a robot, which is configured to process the object, based on a measurement result of the measurement device,
wherein the measurement device comprises: a sensor including an illuminator configured to illuminate the object and an image capturing device configured to capture an image of the object illuminated by the illuminator; and a sensor controller configured to obtain the image of the object by controlling the illuminator and the image capturing device, the image of the object being used for measuring a position of the object, the sensor being attached to the robot and moving with the robot
wherein the sensor controller is configured to output a signal which causes the robot controlling device to obtain positional information of the sensor,
wherein the robot controlling device is configured to obtain the positional information of the sensor in accordance with the signal which causes the robot controlling device to obtain the positional information of the sensor;
wherein the sensor controller is configured to obtain the position of the object based on the image of the object obtained by the sensor and the positional information of the sensor obtained by the robot controlling device; and wherein the robot controlling device is configured to control the robot based the position of the object obtained by the sensor controller.

26. A robot system comprising a robot configured to process an object based on a positon of the object measured by a measurement device, and a robot controlling device configured to control the robot, the measurement device comprising a sensor including an illuminator configured to illuminate the object and an image capturing device configured to capture an image of the object illuminated by the illuminator; and a sensor controller configured to obtain the position of the object by controlling the illuminator and the image capturing device,
 wherein the robot controlling device is configured to obtain positional information of the sensor which is attached to the robot, while the robot moves with the sensor, in accordance with a signal which is provided from the measurement device, and
 wherein the robot controlling device is configured to control the robot based on the position of the object which is obtained based on the image of the object obtained by the sensor and the positional information of the sensor.

\* \* \* \* \*